(12) United States Patent
Ueda et al.

(10) Patent No.: US 6,188,786 B1
(45) Date of Patent: *Feb. 13, 2001

(54) IMAGE PROCESSING APPARATUS THAT DETERMINES AN AREA IN AN IMAGE BASED ON COLOR INFORMATION

(75) Inventors: Masashi Ueda; Ryohei Komiya, both of Nagoya (JP)

(73) Assignee: Brother Kogyo Kabushiki Kaisha, Nagoya (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/755,644

(22) Filed: Nov. 25, 1996

(30) Foreign Application Priority Data

Dec. 1, 1995 (JP) .................................... 7-314023

(51) Int. Cl.[7] ...................................... G06K 9/00
(52) U.S. Cl. .......................................... 382/165; 382/225
(58) Field of Search ................... 345/429, 431; 382/118, 162, 164, 165, 170, 173, 199, 203, 205, 282, 283, 242, 266, 225, 224; 358/453, 538

(56) References Cited

U.S. PATENT DOCUMENTS

| | | | |
|---|---|---|---|
| 5,309,228 | * 5/1994 | Nakamura | 358/500 |
| 5,335,293 | * 8/1994 | Vannelli et al. | 382/110 |
| 5,544,650 | * 8/1996 | Boon et al. | 382/133 |
| 5,596,362 | * 1/1997 | Zhou | 382/118 |
| 5,629,752 | * 5/1997 | Kinjo | 382/118 |

FOREIGN PATENT DOCUMENTS

| | | | |
|---|---|---|---|
| 2-155771 | 6/1990 | (JP) | B41J/2/52 |
| 2-284274 | 11/1990 | (JP) | G06F/15/70 |
| 5-324786 | 12/1993 | (JP) | G06F/15/62 |

* cited by examiner

Primary Examiner—Amelia Au
Assistant Examiner—Timothy M. Johnson
(74) Attorney, Agent, or Firm—Oliff & Berridge, PLC

(57) ABSTRACT

An image processing apparatus including a color-information obtaining device which obtains color information relating to a color of a target-area picture-element group consisting of a plurality of picture elements belonging to a target area as one of a plurality of areas present in an object image, a characteristic-information obtaining device which obtains characteristic information which relates to a characteristic of the object image and which is different from the color information, and a target-area determining device for determining the target area in the object image based on the color information and the characteristic information.

11 Claims, 17 Drawing Sheets

| | | P1 | P2 | P3 | P4 | --- |
|---|---|---|---|---|---|---|
| DENSITY OF PICTURE ELEMENT | | 100 | 50 | 150 | 200 | --- |

| | | P1 | P2 | P3 | P4 | --- |
|---|---|---|---|---|---|---|
| SUMMED DENSITIES | | 100 | 100+50 =150 | -105+150 =45 | 45+200 =245 | --- |
| BINARY OUTPUT | 0: NOT PRINTED 1: PRINTED | 0 | 1 | 0 | 1 | --- |
| BINARY-CODING ERROR | | 100-0 =100 | 150-255 =-105 | 45-0 =45 | 245-255 =-10 | --- |

TARGET AREA    NON-TARGET AREA

FIG. 21

WORD-TO-SHAPE LOOK-UP TABLE 304

| KEYWORD | ADDRESS |
|---|---|
| ORANGE | 1 |
| APPLE | 1 |
| BANANA | 2 |
| STRAWBERRY | 3 |
| PROFILE | 4 |
| ⋮ | ⋮ |

SHAPE-INFORMATION MEMORY 300

| ADDRESS | SHAPE INFORMATION |
|---|---|
| 1 | ... |
| 2 | ... |
| 3 | ... |
| 4 | ... |
| ⋮ | ⋮ |

FIG. 22

WORD-TO-COLOR LOOK-UP TABLE 306

| KEYWORD | COLOR INFORMATION |
|---|---|
| ORANGE | $X_1\ Y_1\ Z_1$ |
| APPLE | $X_2\ Y_2\ Z_2$ |
| ⋮ | ⋮ |

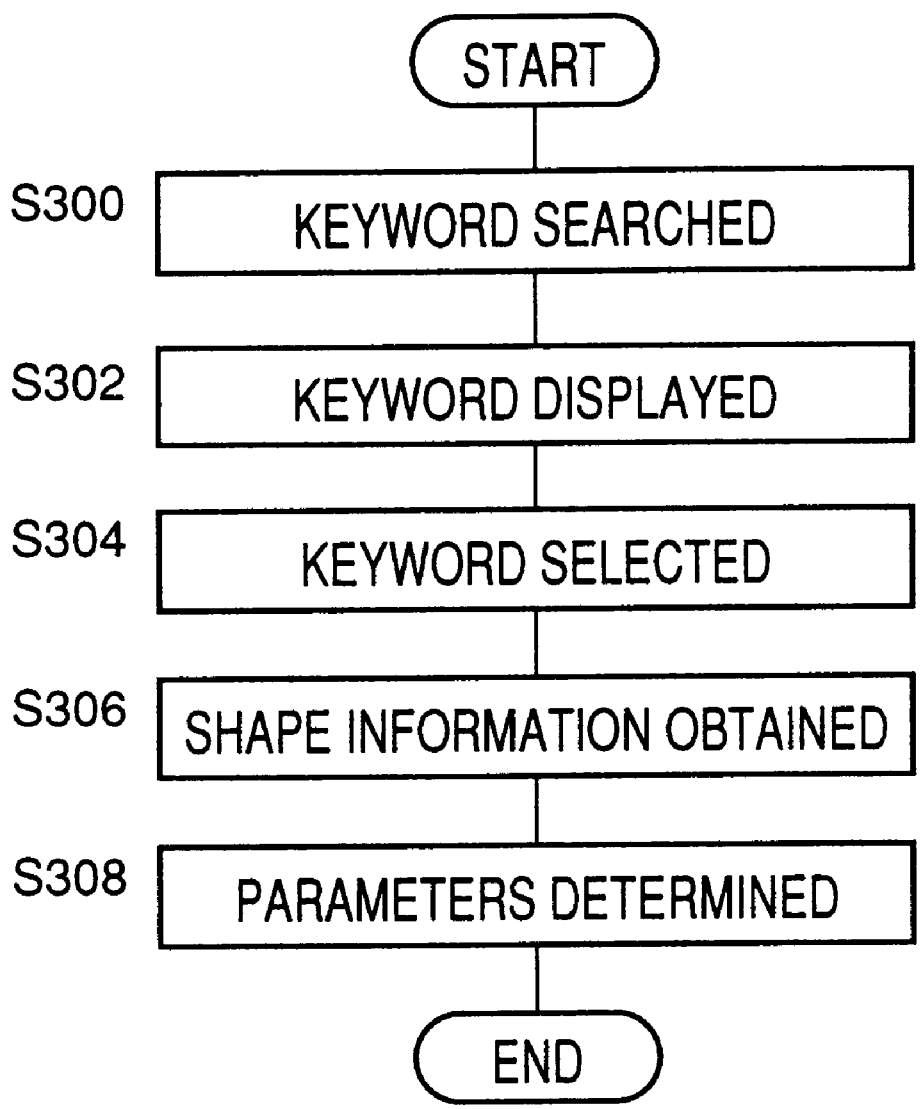

IMAGE PROCESSING APPARATUS THAT DETERMINES AN AREA IN AN IMAGE BASED ON COLOR INFORMATION

BACKGROUND OF THE INVENTION

1. Field of the Invention

The present invention relates to an image processing apparatus and in particular to the art of determining an area in an image based on color information.

2. Related Art Statement

There is known an image processing device including a target-area determining means for determining a target area as one of a plurality of areas present in an object area, based on color information representing the color of each of a plurality of picture elements belonging to the target area. For example, a recent color-image printer has the function of cutting out, from an input image including a so-called "memory" color, an area having the memory color and converting the area (i.e., color-image data representing the area) in a special manner different from a common conversion manner, when producing an output image. A memory color is a color which human beings keep in their memory for a particular thing such as human being's skin or cherry's petal. However, generally, the difference between the memory color and the actual color of the thing is not negligible. Therefore, an output image is often better appreciated when a memory color, i.e., color which human beings keep in their memory is used than when an actual color is used. Accordingly, there has been developed the art of determining a target area having a memory color and converting color-image data representing the target area in a special manner (hereinafter, referred to as the "memory-color" conversion) different from a manner in which color-image data representing a non-target area other than the target area in the input image is converted.

Japanese Patent Application laid open for inspection purposes under Publication No. 5(1993)-324786 discloses an image processing device including a means for determining an area in an image based on color information. In this prior device, whether or not each of the picture elements of an original image belongs to a particular area to be subjected to a special color conversion is judged in the following manner: First, a primary target-area picture element is designated as a picture element to be subjected to the special color conversion, and a plurality of secondary target-area picture elements neighboring the primary element are determined according to a predetermined rule. Then, the respective colors of the primary and secondary elements are plotted in a color space, and are weighed by a probability distribution function (e.g., normal distribution function). Thus, a reference weighed distribution pattern is obtained. Concerning every picture element of the original image, a weighed distribution pattern is obtained in the same manner as described above, and is compared with the reference pattern. If the two patterns can be so similar as to be regarded as coinciding with each other, the picture element in question is judged as belonging to the target area.

However, in the above-identified prior device, a target area is determined based on only the color information representing the respective colors of the primary and secondary picture elements, and an inaccurate area may be determined as the target area. For example, when the prior device converts image data representing a color image including cherry's petals and a person wearing a cloth having a color similar to the color of the petals, the prior device may apply a special "memory-color" conversion to not only the petals but the cloth. In this case, the output image of the petals will be appreciated but the output image of the cloth will not be appreciated. In other words, the prior device cannot achieve both to satisfy human beings' sense to cherry's petals and to reproduce an accurate color of a cloth.

SUMMARY OF THE INVENTION

It is therefore a first object of the present invention to provide an image processing apparatus including means for determining a target area in an object image based on characteristic information relating to a characteristic of the object image.

It is a second object of the present invention to provide a recording medium in which a control program is recorded which is usable by a computer to determine a target area in an object image based on characteristic information relating to a characteristic of the object image.

The above first object has been achieved by the present invention. According to a first aspect of the present invention, there is provided an image processing apparatus comprising a target-area picture-element designator which designates at least one primary target-area picture element belonging to a target area as one of a plurality of areas present in an object image; target-area determining means for determining the target area in the object image based on at least color information relating to a color of each of the at least one primary target-area picture element designated by the target-area picture-element designator and a plurality of secondary target-area picture elements automatically determined based on the primary target-area picture element, the primary and secondary target-area picture elements providing a designated target-area picture-element group; a characteristic-information obtaining device which obtains characteristic information which relates to a characteristic of the object image and which is different from the color information relating to the designated target-area picture-element group; and the target-area determining means determining the target area in the object image based on the color information and the characteristic information.

In the image processing apparatus in accordance with the first aspect of the invention, a target area is determined based on not only the color information of the designated target-area picture-element group (hereinafter, referred to as the "first" group) but also the characteristic information of the object image to be processed. In the prior art in which a target area is determined based on only the color information, picture elements having color information similar to the color information of the first group are judged as belonging to the target area. However, this may not be appropriate in some cases. For example, in the case where an object image includes a target area having a "memory" color and a non-target area having a color which is not the memory color but similar to the memory color, the non-target area may erroneously be determined as a portion of the target area. Hence, the present image processing apparatus utilizes characteristic information relating to a characteristic of the object image. The characteristic information is not the color information relating to the color of the first group and is effective in determining the target area. The characteristic information is not information common to all images, but is specific to the object image in question and can be obtained from the object image. The characteristic information may automatically be obtained from the object image but may be obtained from the same with the help of an operator as recited below. The present apparatus can determine a target area in an object image with high reliability.

According to a preferred feature of the first aspect of the invention, the target-area picture-element designator comprises means for designating the secondary target-area picture elements based on color information relating to the color of the primary target-area picture element and color information relating to a color of each of a plurality of picture elements neighboring the primary target-area picture element. The number and/or pattern of neighboring picture elements needed for providing accurate color information will change depending upon the position of the primary target-area picture element (or primary non-target-area picture element, described below) in the object image. If an appropriate number or an appropriate pattern is not employed, the determination of the target area will adversely be affected. On the other hand, if an appropriate number of neighboring picture elements having an appropriate pattern are employed, a distribution pattern in a color space of respective colors of the neighboring picture elements will not change so largely, even if the positions of the neighboring picture elements may more or less change in the object image. This can be used for designating the secondary target-area picture elements (or secondary non-target-area picture elements, described below).

According to another feature of the first aspect of the invention, the color information relating to the color of the each of the primary and secondary target-area picture elements of the designated target-area picture-element group comprises first color information relating to a hue of the each target-area picture element and second color information relating to a saturation of the each target-area picture element. In this case, the color information represents the color itself of each picture element from which the component of luminance is removed. The magnitude of luminance changes depending upon the nature of the outer surface of an object article and/or the shading of a lighting device. Thus, the color information enjoys high reliability. However, in place of the combination of hue and saturation, it is possible to employ, as the color information, chromaticity values defined by the CIE XYZ color system or the UVW color system as one of the UCS color systems.

According to another feature of the first aspect of the invention, the characteristic-information obtaining device comprises an input device which is operable by an operator for inputting input information, and information obtaining means for obtaining the characteristic information based on the input information. It is important that the input information is input by the operator. Human beings have many abilities about image recognition which are superior to those of state-of-the-art image-recognizing devices. Therefore, in many cases, a target area is appropriately determined with the help of a human being. The input information has only to be different from the color information of the first group, that is, may be position information representing the position of the first group. Although the prior device requires an operator to input position information to designate one or more picture elements in a target area, the input position information is not obtained for determining the target area but for obtaining color information representing the color of the designated picture element or the respective colors of the designated picture element and a group of picture elements including the designated picture element.

According to another feature of the first aspect of the invention, the input device comprises means for inputting the input information comprising shape information relating to a shape of the target area, and the information obtaining means comprises means for producing the characteristic information relating to the shape of the target area, based on the input information comprising the shape information. A representative of the shape information relating to the shape of the target area is shape-representing information representing the shape of the target area. The shape-representing information may be input by the operator and may be obtained as the characteristic information. However, shape information which provides the basis for specifying the shape of the target area may be input by the operator, and shape-representing information representing the shape of the target area may be obtained as the characteristic information from the shape information. For example, in the case where a border line between a target area and a non-target area can be approximated by a simple geometric shape such as a segment or a circle, the sort of the geometric shape and/or the position thereof can be used as shape-representing information, for determining the target area appropriately. In the case where a target area has a complex shape, position information representing a number of points on a border line between a target and a non-target area may be input as shape-representing information by the operator. It is not essentially required that the shape represented by the obtained shape-representing information be completely identical with the actual shape of the target area. For example, a provisional target area may be determined based on the obtained shape-representing information, and a final or true target area may be determined based on color information relating to the respective colors of picture elements existing in the neighborhood of the border line or lines of the provisional target area. In the last case, the provisional target area is used as a candidate or an approximate area for the final or true target area.

According to another feature of the first aspect of the invention, the input device comprises a non-target-area picture-element designator which is operable for designating at least one primary non-target-area picture element belonging to a non-target area of the object image as a different one of the areas from the target area, and the information obtaining means comprises means for obtaining the characteristic information comprising at least one of position information relating to a position of the primary non-target-area picture element designated by the non-target-area picture-element designator and color information relating to a color of each of the at least one primary non-target-area picture element and a plurality of secondary non-target-area picture elements automatically determined based on the primary non-target-area picture element, the primary and secondary non-target-area picture elements providing a designated non-target-area picture-element group. In the case where a target area has a color quite different from the color of a non-target area, the target area may be determined based on only color information representing the respective colors of picture elements of a first group. However, in the case where a non-target area has a color similar to that of a target area, the target and non-target areas are more accurately distinguished from each other based on the characteristic information comprising at least one of the position information of the designated primary non-target-area picture element and the color information of the designated non-target-area picture-element group or second group. In the case where the position information of the designated primary non-target-area picture element is utilized, position information representing the respective positions of the secondary non-target-area picture elements may be utilized together therewith. In addition, in the case where a plurality of primary target-area picture elements and/or a plurality of primary non-target-area picture elements are designated, more information about the position and shape of a target area in an object area may be obtained. In the case where the color information of the second group is utilized, a target area may be determined by statistically analyzing the color information representing the respective colors of the picture elements of the first group and the color information representing the respective colors of the picture elements of the second group. In either case, a target area can be determined with higher reliability.

According to another feature of the first aspect of the invention, the image processing apparatus further comprises first-pattern determining means for determining a first distribution pattern, in a color space, of the respective colors of the primary target-area picture element and the secondary target-area picture elements of the designated target-area picture-element group, wherein the information obtaining means comprises second-pattern determining means for determining a second distribution pattern, in the color space, of the respective colors of the primary non-target-area picture element and the secondary non-target-area picture elements of the designated non-target-area picture-element group, and the target-area determining means comprises means for determining the target area based on a degree of coincidence of each of the first and second distribution patterns and a third distribution pattern, in the color space, of respective colors of each of a number of picture elements in the object image and a plurality of picture elements automatically determined based on the each picture element. In a prior device, a target area is determined by judging whether the degree of coincidence of the first distribution pattern and a third distribution pattern determined for each picture element in an object area is greater than a reference value. Therefore, the reference value must be pre-determined and pre-stored in a memory of the device. In the present apparatus, however, those operations are not needed. There are known various techniques for judging which one of two or more categories a certain pattern should belong to. One of those techniques may be used to judge to which each picture element in an object area belongs, a target area or a non-target area.

According to another feature of the first aspect of the invention, the non-target-area picture-element designator comprises means for designating the secondary non-target-area picture elements based on color information relating to the color of the primary non-target-area picture element and color information relating to a color of each of a plurality of picture elements neighboring the primary non-target-area picture element.

According to a second aspect of the present invention, there is provided an image processing apparatus comprising a color-information obtaining device which obtains color information relating to a color of a target-area picture-element group consisting of a plurality of picture elements belonging to a target area as one of a plurality of areas present in an object image; a characteristic-information obtaining device which obtains characteristic information which relates to a characteristic of the object image and which is different from the color information; and target-area determining means for determining the target area in the object image based on the color information and the characteristic information.

The image processing apparatus in accordance with the second aspect of the invention enjoys the same advantages as those of the image processing apparatus in accordance with the first aspect of the invention.

According to a preferred feature of the second aspect of the invention, the color-information obtaining device comprises a target-area picture-element designator which is operable for designating at least one primary target-area picture element belonging to the target area, wherein the target-area determining means comprises means for determining the target area in the object image based on the color information relating to a color of each of the at least one primary target-area picture element designated by the target-area picture-element designator and a plurality of secondary target-area picture elements automatically determined based on the primary target-area picture element, the primary and secondary target-area picture elements providing a designated target-area picture-element group.

The above second object has been achieved by the present invention. According to a third aspect of the present invention, there is provided a recording medium in which an image-processing control program is recorded which is readable by a computer and usable to control the computer to process image data, the program comprising the steps of designating at least one primary target-area picture element belonging to a target area as one of a plurality of areas present in an object image, obtaining color information relating to a color of each of the designated primary target-area picture element and a plurality of secondary target-area picture elements automatically determined based on the primary target-area picture element, the primary and secondary target-area picture elements providing a designated target-area picture-element group, obtaining characteristic information which relates to a characteristic of the object image and which is different from the color information relating to the designated target-area picture-element group, and determining the target area in the object image based on the color information and the characteristic information.

The recording medium in accordance with the third aspect of the invention may be a read only memory (ROM) as a component of a computer, or a floppy disk which can be inserted in a reading device of a computer and can be read by the computer.

According to a preferred feature of the third aspect of the invention, the step of obtaining the characteristic information comprises obtaining the characteristic information based on input information which is input by an operator through an input device.

According to another feature of the third aspect of the invention, the step of obtaining the color information comprises designating the secondary target-area picture elements based on color information relating to the color of the primary target-area picture element and color information relating to a color of each of a plurality of picture elements neighboring the primary target-area picture element.

According to another feature of the third aspect of the invention, the step of obtaining the color information comprises the color information comprising first color information relating to a hue of the each of the primary and secondary target-area picture elements of the designated target-area picture-element group, and second color information relating to a saturation of the each target-area picture element.

According to a fourth aspect of the present invention, there is provided a recording medium in which an image-processing control program is recorded which is readable by a computer and usable to control the computer to process image data, the program comprising the steps of obtaining color information relating to a color of a target-area picture-element group consisting of a plurality of picture elements belonging to a target area as one of a plurality of areas present in an object image, obtaining characteristic information which relates to a characteristic of the object image and which is different from the color information, and determining the target area in the object image based on the color information and the characteristic information.

According to a preferred feature of the fourth aspect of the invention, the step of obtaining the color information comprises designating at least one primary target-area picture element belonging to the target area, and obtaining color information relating to a color of each of the designated primary target-area picture element and a plurality of secondary target-area picture elements automatically determined based on the designated primary target-area picture element, the primary and secondary target-area picture elements providing a designated target-area picture-element group.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which:

FIG. 21 is a diagrammatic view of a word-to-shape look-up table and a shape-information memory of the ROM of FIG. 20;

FIG. 22 is a diagrammatic view of a word-to-color look-up table of the ROM of FIG. 20; and FIG. 23 is a flow chart representing a control program according to which shape information is input using a keyword.

DETAILED DESCRIPTION OF THE PREFERRED EMBODIMENTS

Figure 1:
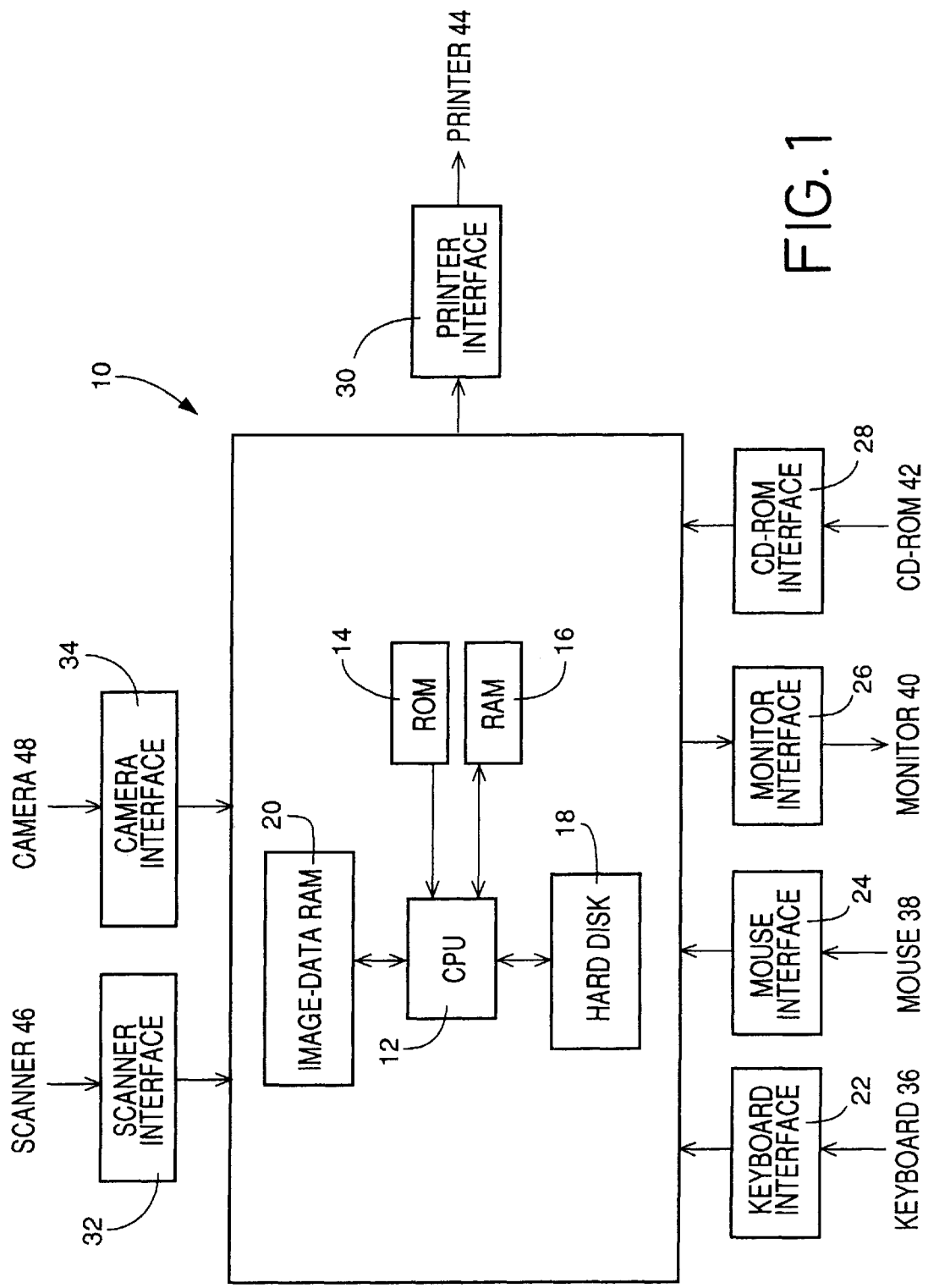
FIG. 1 is a block diagram illustrating the construction of an image processing system to which the present invention is applied.

Referring first to FIG. 1, there will be described an image processing system to which the present invention is applied. The present system obtains, from a scanner 46, a camera 48, or a CD-ROM 42, color-image data representing a color image consisting of a multiplicity of picture elements each of which can have one of composite colors of red ("R"), green ("G"), and blue ("B") (hereinafter, referred to as the "RGB full-color image data"), processes the obtained RGB full-color image data, and outputs the processed image data to an ink-jet printer 44. Each of the three colors, RGB, corresponds to 8 bit. Therefore, each picture element can have one of $2^8 \times 2^8 \times 2^8$ composite colors. The processing of the RGB full-color image data may comprise the common preliminary processing of the image data, the special color conversion of the image data into one or more "memory" colors, etc.

In FIG. 1, reference numeral 10 designates a control device 10 of the present system. The control device includes a CPU 12, a ROM 14, a RAM 16, a hard disk 18 having a large memory capacity, and an image-data RAM 20 which stores RGB full-color image data. A keyboard interface 22, a mouse interface 24, a monitor interface 26, a CD-ROM interface 28, a printer interface 30, a scanner interface 32, and a camera interface 34 are connected to the control device 10. The control device 10 can obtain RGB full-color image data from the scanner 46, camera 48, or CD-ROM 42 through the scanner interface 32, camera interface 34, or CD-ROM interface 28, respectively.

The present system or the control device 10 thereof can process the RGB full-color image data stored in the image-data RAM 20, according to an image-processing control program stored in the ROM 14.

Figure 2:
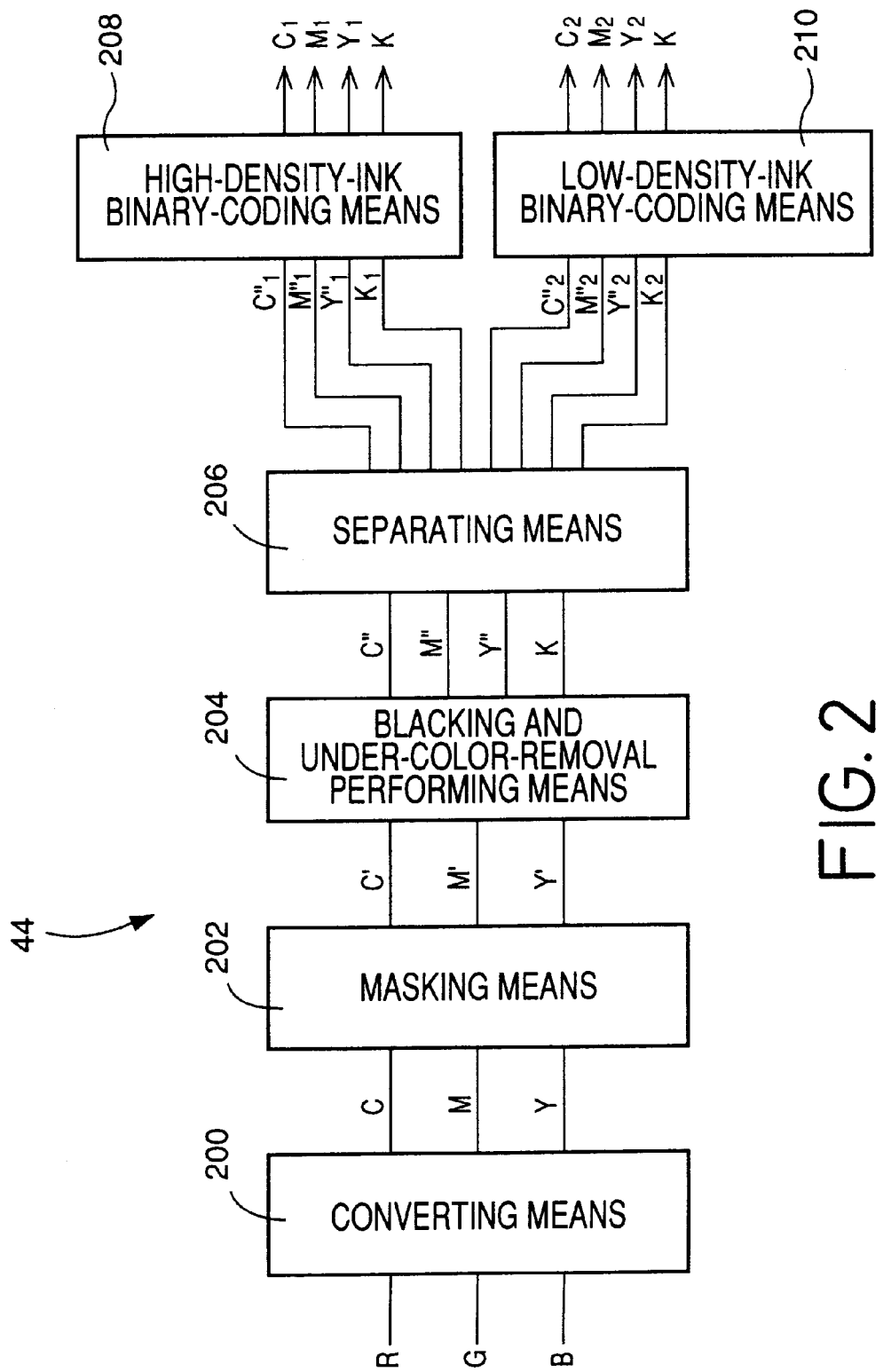
FIG. 2 is a block diagram illustrating various functions of an ink-jet printer which can be connected to the image processing system of FIG. 1.

The ink-jet printer 44 has various functions, as shown in FIG. 2, for processing the RGB full-color image data output from the image processing system shown in FIG. 1, so as to print a full-color image corresponding to the RGB full-color image data obtained from the CD-ROM 42, scanner 46, or camera 48.

The printer 44 has a data converting means 200 for converting full-color image data, i.e., RGB data into CMY (cyan, magenta, yellow) data, according to the following expressions (1), (2), and (3):

$$C = -\log R \quad (1)$$

$$M = -\log G \quad (2)$$

$$Y = -\log B \quad (3)$$

The CMY data produced from the data converting means 200 are subjected to masking by a masking means 202, i.e., converted into C'M'Y' data. In the technique of color-image printing, the subtractive color mixture based on the three colors, CMY, is employed to reproduce a given color image. However, no color inks can have ideal absorption or reflection characteristics, respectively, e.g., they cannot help exhibiting more or less excessive absorption or reflection degrees. Accordingly the quality of printing may decrease because printed colors do not correspond to original colors. This problem may be solved by masking, e.g., linear masking in accordance with the following expression (4):

$$(C', M', Y')^T = A \cdot (C, M, Y)^T \quad (4)$$

In the above expression, the symbol "$T$" indicates the transposed matrix of the parenthesized matrix. The matrix, A, is a three-row, three-column coefficient matrix. In a particular case where the quality of coloring decreases due to the color mixture, the CMY data may be subjected to second-order or higher-order masking. The following expression (5) exemplifies the second-order masking:

$$(C', M', Y')^T = B \cdot (C, M, Y, C2, M2, Y2, C \cdot M, M \cdot Y, Y \cdot C)^T \quad (5)$$

The matrix, B, is a three-row, nine-column coefficient matrix. The matrixes A, B are determined by method of least squares so as to reduce the differences between original colors of an original image and the corresponding, reproduced colors of an image recorded on a recording sheet by the ink-jet printer 44.

The C'M'Y' data output from the masking means 202 are then subjected to blacking and under color removal by a blacking and under-color-removal performing means 204. The term "blacking" means changing a high-density color to a black color, thereby improving the reproducibility of the high-density color and providing a printed matter free from poor color registration. The density of black color, K, is calculated according to the following expression (6):

$$K = \min(C', M', Y') \quad (6)$$

Thus, the lowest one of the respective densities of the three colors, C'M'Y', is determined as the density of black color K. The term "under color removal" means removing the respective gray components of the three colors C'M'Y', thereby reducing the respective consumption amounts of CMY inks that are considerably expensive. The under color removal is performed according to the following expression (7):

$$(C'', M'', Y'')^T = (C', M', Y')^T - \alpha \cdot K \quad (7)$$

where α is a constant.

Figure 3:
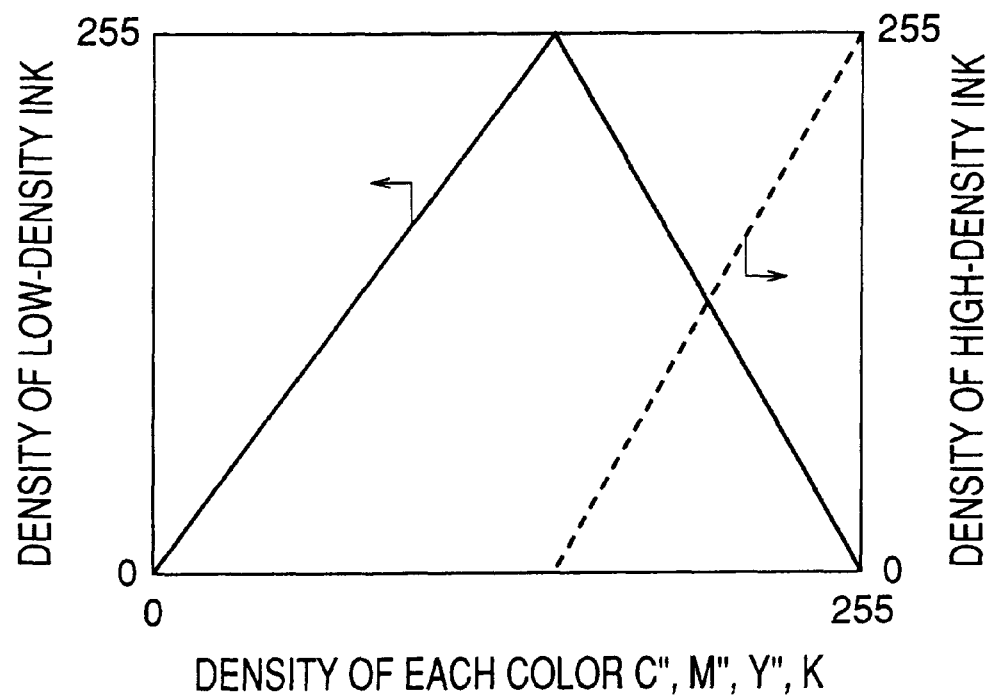
FIG. 3 is a graph representing a relationship between density of each of colors of an image processed by the system of FIG. 1, and density of each of corresponding high-density and low-density inks of the printer of FIG. 2.

The printer 44 further has a separating means 206 which separates the respective densities of four colors, C'', M'', Y'', K produced by the blacking and under-color-removal performing means 204, into the respective densities, $C''_1$, $M''_1$, $Y''_1$, $K_1$, of four high-density inks, and the respective densities, $C''_2$, $M''_2$, $Y''_2$, $K_2$, of four low-density inks, according to a conversion table, as shown in FIG. 3, for each of the four colors C'', M'', Y'', K. In FIG. 3, the densities of each low-density ink are indicated at solid line and the densities of each high-density ink are indicated at broken line. In the case where the density of each color C'', M'', Y'', K is not higher than a corresponding threshold value, that density is represented by a half-tone value of a corresponding low-density ink only. On the other hand, in the case where the density of each color C'', M'', Y'', K is higher than the threshold value, that density is represented by combining appropriate half-tone values of both the corresponding high-density and low-density inks for each color.

The printer 44 further includes a high-density-ink-related binary-coding means 208 and a low-density-ink-related binary-coding means 210 which codes the respective densities $C''_1$, $M''_1$, $Y''_1$, $K_1$ of the four high-density inks, and the respective densities $C''_2$, $M''_2$, $Y''_2$, $K_2$ of the four low-density inks, respectively, into binary codes. In the art of printers such as ink-jet printers, thermal printers, and electrophotographic printers, there are known various half-tone reproducing methods in which half tones of a color image are reproduced by combining a small number of colors. For example, in the "area" half-tone reproducing method, the density of a color of a multilevel color image is reproduced by the number of bilevel picture elements each of which can take the value of 1 or 0. Binary codes representing a multilevel color image may be produced by dither methods, density-pattern methods, or eclectic methods in which the color of each picture element of an original multilevel color image is binary-coded by using color information representing the color of each of a plurality of picture elements neighboring that picture element in question. A representative of those eclectic methods is error diffusion methods. Although any half-tone reproducing method may be employed according to the principle of the present invention, an error diffusion method is employed in the present embodiment.

Figures 4, 5:
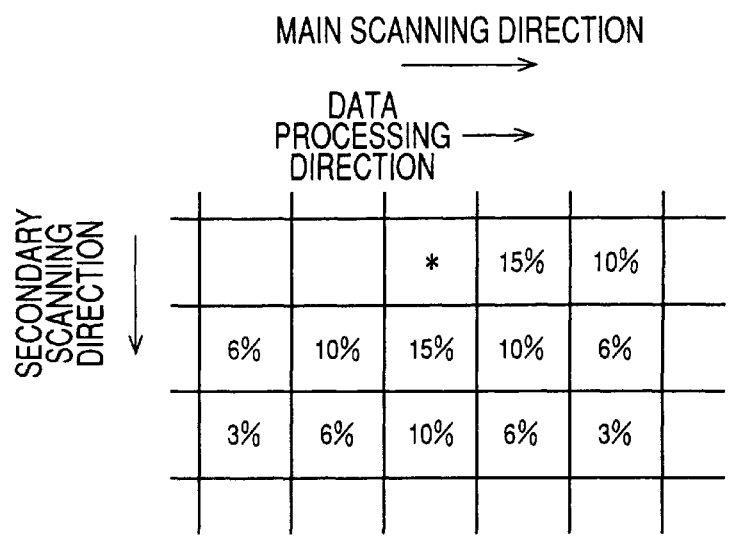
FIG. 4 is a view for illustrating an error diffusion method which can be employed by the printer of FIG. 2 for coding the image data supplied from the system of FIG. 1 into binary codes.
FIG. 5 is a view for illustrating another error diffusion method which can be employed by the printer of FIG. 2 for coding the image data supplied from the system of FIG. 1 into binary codes.

Referring next to FIGS. 4 and 5, there will be described the steps in which half tones are produced by the error diffusion method.

FIG. 4 shows four picture elements, $P_1$ to $P_4$, on a straight line. It is assumed that each picture element $P_1$–$P_4$ has 8-bit information (i.e., 256 tones or grades) and that the number of 128 is used as a threshold value for binary coding. In the error diffusion method, any picture element having a density value not smaller than the threshold value (128) is coded into a picture element having the density value of 255, i.e., is printed. However, any picture element having a density value smaller than the threshold value is coded into a picture element having the density value of 0, i.e., is not printed. In either case, the difference between the original density value and the coded density value (255 or 0) is added as a binary-coding error to the density value of the next picture element. Regarding the example shown in FIG. 4, since the first element $P_1$ has the density value of 100 that is smaller than the threshold value, the value 100 of element $P_1$ is coded into the density value of 0, i.e, the element $P_1$ is not printed. The binary-coding error, 100, is obtained by subtracting "0" from "100", and is added to the value, 50, of the next element $P_2$. Thus, since the value of element $P_2$ becomes 150 that is greater than the threshold, the value of 150 is coded into the value of 255, i.e., the element $P_2$ is printed. At this time, the binary-coding error is −105, which is added to the value, 150, of the next element $P_3$. Those steps are repeated on all the picture elements of an original image, in the manner illustrated in a lower portion of FIG. 4. Thus, the original image is coded into binary codes by the error diffusion method.

In the above-described error diffusion method, 100% of an error obtained from a picture element $P_n$ is added to the next picture element $P_{n+1}$ only. However, in the present embodiment, the error is divided into a plurality of weighed values, which then are distributed to a plurality of neighboring picture elements, respectively.

FIG. 5 shows an example of a weighing pattern which is employed in the present embodiment. The symbol "*" represents a current picture element which has just been coded into a binary code, 255 or 0. The binary-coding error obtained from the current picture element is divided into a plurality of weighed values that amount to 100% and the weighed values are distributed to respective picture elements which neighbor the current element and each of which is given a specific weighed percentage. Thus, each picture element is given a plurality of weighed values from a plurality of neighboring elements, and those values are temporarily stored in the RAM 16.

As described above, the image processing system shown in FIG. 1 produces RGB image data, which are supplied to the ink-jet printer 44 which finally codes the image data into binary codes in the error diffusion method and performs printing according to the binary codes.

Next, there will be described the manner in which the control device 10 of the image processing system determines a specific area (hereinafter referred to as the "target area") in an original, real image (hereinafter, referred to as the "object image") when producing the RGB image data to be supplied to the ink-jet printer 44.

Figure 6:
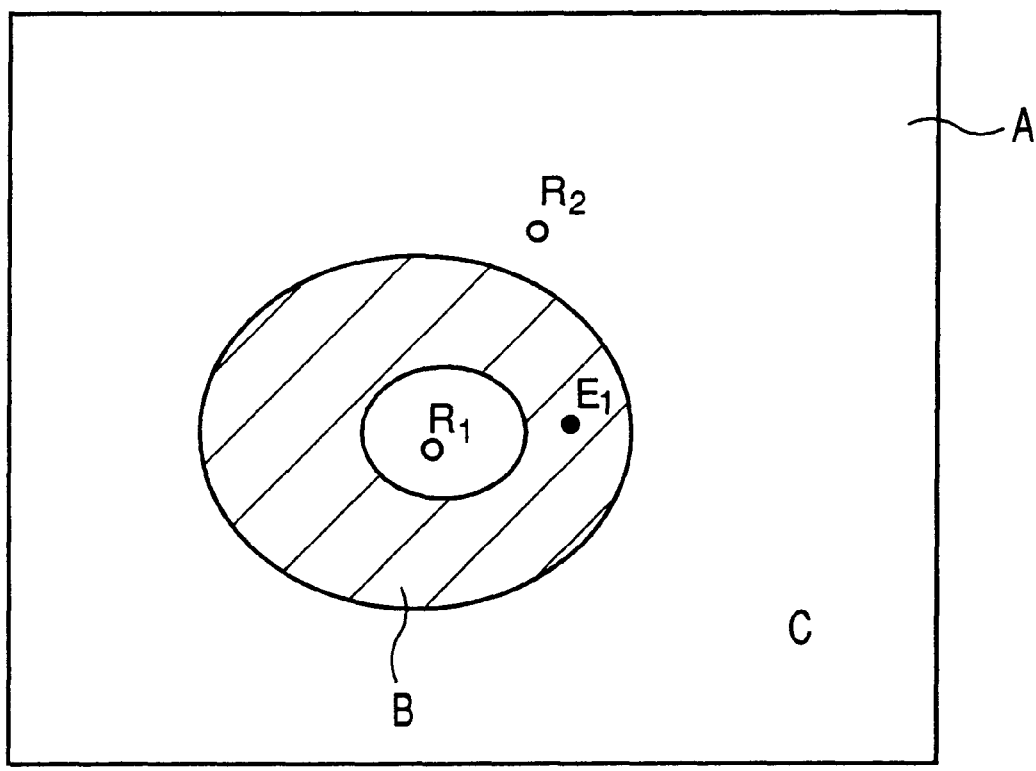
FIG. 6 is a view of an example of a simple real image as an object image including a target area and a non-target area.

FIG. 6 shows a simple example of an object image, A, including a target area, B, indicated at hatching, and a non-target area, C, other than the target area B. In order to determine a border line between the target area B and the non-target area C, the present system can utilize first information relating to at least one first group, $E_1$, of picture elements in the target area B, and second information relating to one or more second groups, $R_1$, $R_2$, of picture elements in the non-target area C. The present system distinguishes the two areas B, C from each other by utilizing the first and second information. The two areas B, C thus separated from each other may be subjected to different types of color conversions, respectively, and RGB image data with high quality are supplied to the printer 44.

First, the control device 10 of the present system produces, from the RGB image data stored in the image-data RAM 20, an I signal, a Q signal, and a Y signal, according to the following expressions (8), (9), and (10), respectively:

I=0.6R−0.28G−0.32B (8)

Q=0.21R−0.52G+0.31B (9)

Y=0.3R+0.59G+0.11B (10)

The I, Q, Y signals are employed, in the NTSC (U.S. National Television System Committee) color system, in consideration of the characteristics of color sensation of human beings. The I and Q signals correspond to hue and saturation, respectively. The Y signal corresponds to luminance. The I and Q signals are called color-difference signals. Hereinafter, the combination of I and Q signals is referred to as the "IQ data".

Figure 7:
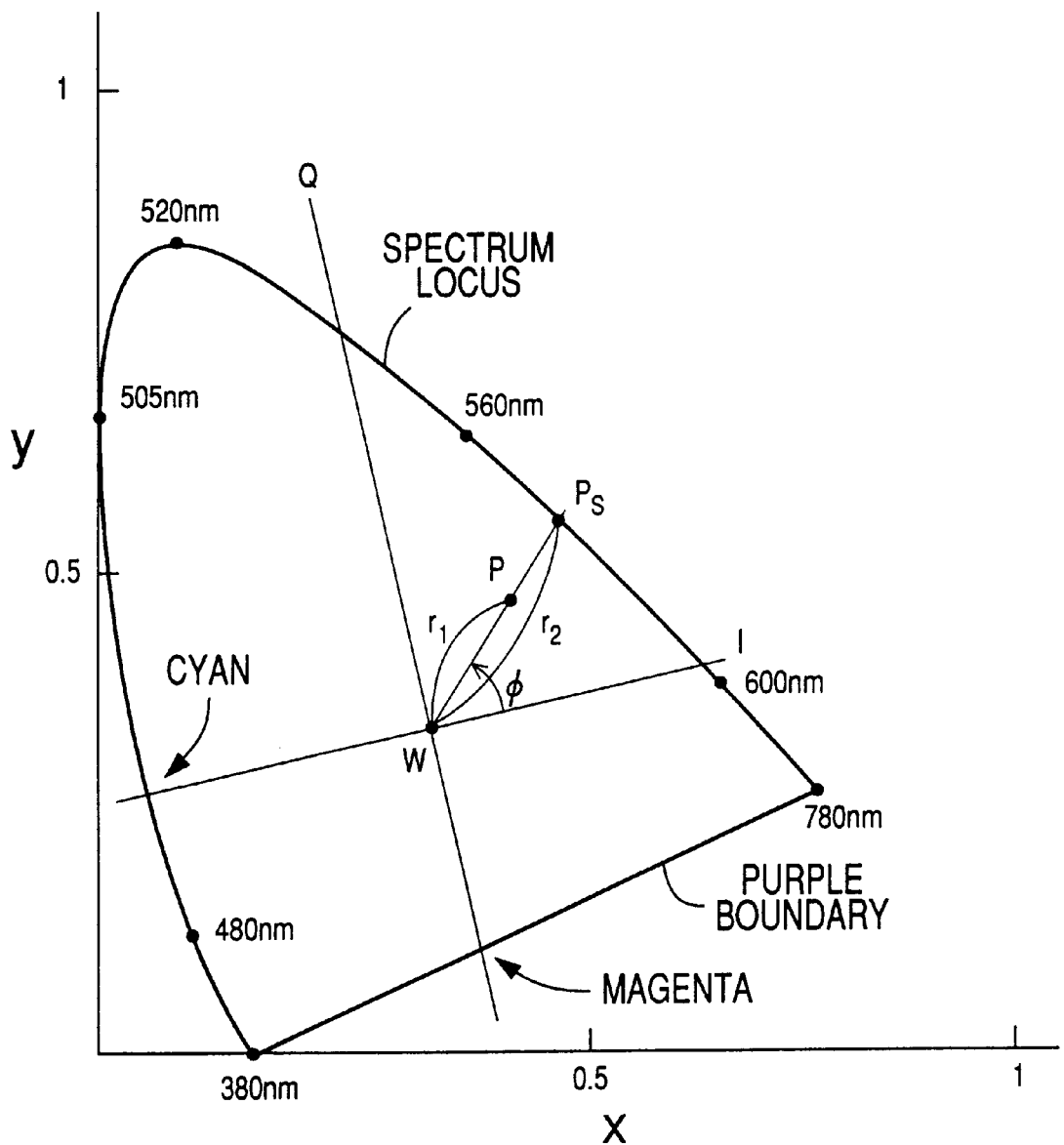
FIG. 7 is a chromaticity diagram for illustrating the manner in which color information obtained by the system of FIG. 1 represents colors of an object image.

The I and Q signals correspond to an I and a Q axis indicated in a chromaticity diagram shown in FIG. 7. The I and Q axes cooperate with each other to define an orthogonal coordinate system, i.e., I-Q plane. IQ data correspond to I and Q coordinates in the I-Q plane defined by the I and Q axes in the chromaticity diagram. The I axis passes through a point, W, corresponding to white color, and intersects a spectrum locus at a point corresponding to cyan color. The Q axis passes through the point W and intersects a purple boundary at a point corresponding to magenta color. The IQ data obtained according to the expressions (8), (9) are plotted at a point, P, in the I-Q plane.

Next, as illustrated in FIG. 7, an H signal corresponding to the hue of the point P is calculated according to one of the following expressions (11), (12), and (13), and an S signal corresponding to the saturation of the point P is calculated according to the following expression (14):

$$H = \phi = \mathrm{Tan}^{-1}(Q/I) \qquad (0 \leq I,\ 0 \leq Q) \tag{11}$$

$$H = \phi = \mathrm{Tan}^{-1}(Q/I) + \pi \qquad (0 > I) \tag{12}$$

$$H = \phi = \mathrm{Tan}^{-1}(Q/I) + 2\pi \qquad (0 \leq I,\ 0 > Q) \tag{13}$$

$$S = r_1/r_2 \tag{14}$$

Hereinafter, the combination of H and S signals is referred to as the "HS data". In FIG. 7, a point, $P_s$, is a point of intersection between a straight line passing through the points W, P and the spectrum locus. In the expression (14), the symbol, $r_1$, represents the length of a segment connecting between the points W, P and the symbol, $r_2$, represents the length of a segment connecting between the points W, $P_s$.

The present image processing system processes image data with respect to color, based on HS data. However, in the case where the present system outputs image data to a peripheral device, such as the ink-jet printer 44 or an RGB display or monitor 40, which operates on RGB image data, the present system inversely converts HS data to IQ data according to one of the expressions (11) to (13) and the expression (14), and then inversely converts the IQ data and a Y signal to RGB data according to the expressions (8) to (10), so that the RGB data are output to the peripheral device. Thus, the present system can automatically perform, on color-image data, a color conversion which is appropriate for the color sensation of human beings, without being adversely effected by, e.g., individual differences of operators.

The control device 10 produces a set of HS data for each picture element. From the sets of HS data corresponding to all the picture elements in the object image, the control device 10 obtains color information representing the color of at least one designated target-area picture-element group, i.e., first group $E_1$, color information representing the color of one or more designated non-target-area picture-element groups, i.e., second groups $R_1$, $R_2$, and color information representing the color of a third group consisting of each picture element and a plurality of picture elements neighboring that picture element in question. The color information may be a simple or weighed average of the respective colors (hues and saturations) of the picture elements of each of the first, second, and third groups. The weighed average may be calculated by using, as weights, a distribution function, such as the normal-distribution function, which well corresponds to the characteristics of eyes of human beings. Any number of picture elements may be employed for providing each of the first, second, and third groups, and a fixed number of picture elements may be employed for each group. However, if the picture-element number is excessively small, the color information may not be sufficiently accurate or reliable. On the other hand, if the number is excessively large, too much time may be needed to obtain the color information for each third group corresponding to each picture element. The same number of picture elements are employed for each of the first, second, and third groups, for easy comparison of color information. It is preferred that this number be as small as possible.

Figure 8:
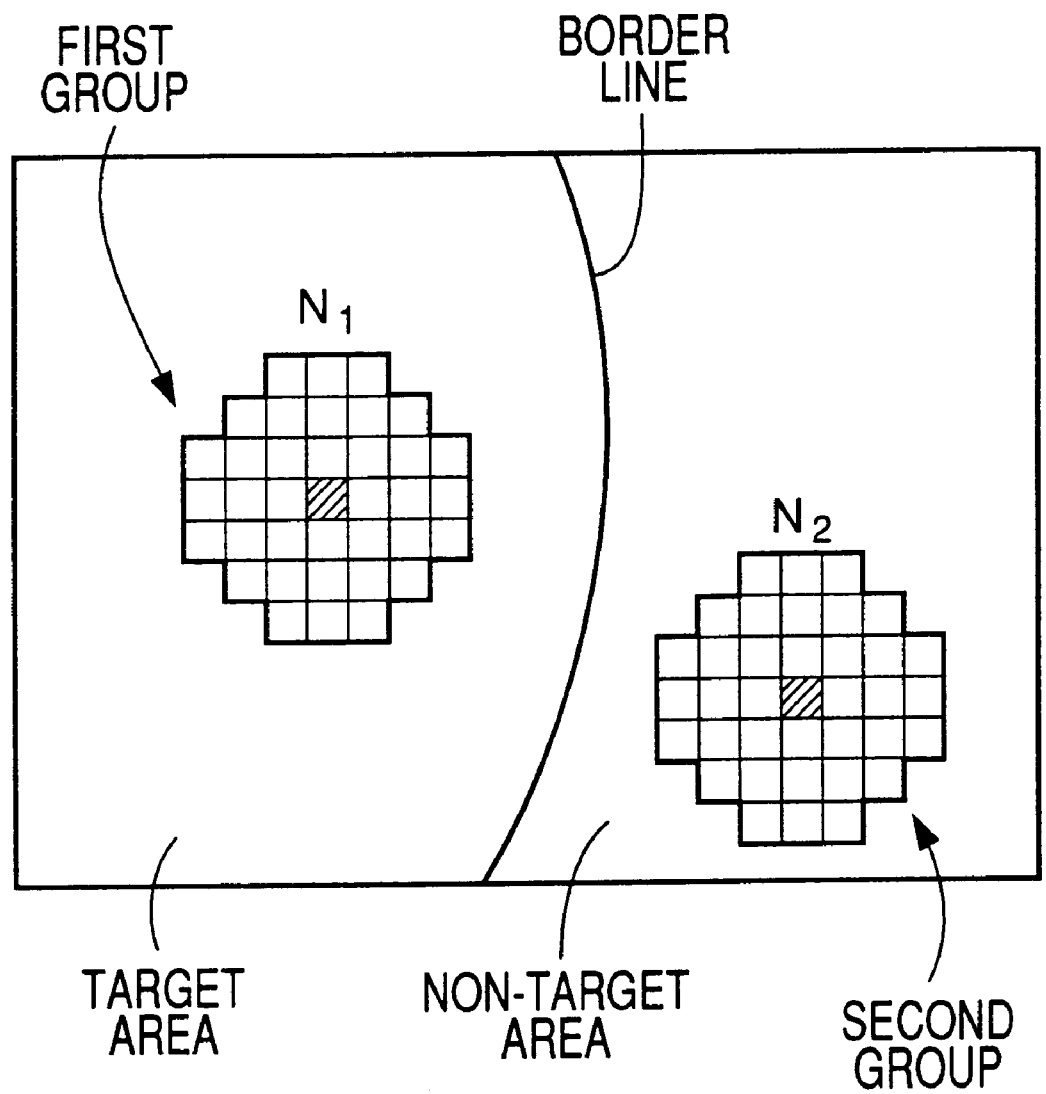
FIG. 8 is an enlarged view of a designated target-area picture-element group, a designated non-target-area picture-element group, and a border line between a target area and a non-target area.

FIG. 8 shows a first group (i.e., designated target-area picture-element group), $N_1$, in a target area of an object image and a second group (i.e., designated non-target-area picture-element group), $N_2$ in a non-target area. In the present embodiment, the number of each group $N_1$, $N_2$ is equal to 37. Each group $N_1$, $N_2$ is automatically determined to have a pattern, shown in FIG. 8, which is near to a circle having, as the center thereof, a primary picture element designated by an operator in a manner described later. Otherwise, the present image processing system may be adapted to automatically determine the total number of secondary picture elements which neighbor a primary picture element designated by the operator and which cooperate with the primary picture element to provide a first or second group $N_1$, $N_2$, based on the color information representing the color of the primary picture element and the color information representing the color of each of a variable number of picture elements neighboring the primary picture element. More specifically, first, the variable number is fixed to a first number, and the respective colors of picture elements of the fixed number of neighboring picture elements are plotted in a color space while the fixed number of neighboring picture elements are translated to different positions relative to the primary picture element. Thus, the degree of coincidence of the respective distribution patterns obtained in the color space is calculated. Then, the variable number is fixed to a second number different from the first number, and the degree of coincidence of the distribution patterns obtained is calculated. Those steps are repeated while the variable number is changed. If a degree of coincidence is found to be greater than a reference value, the corresponding number is determined as the number of secondary picture elements of the first or second group $N_1$, $N_2$. If the respective numbers of the first and second groups $N_1$, $N_2$ are different from each other, the larger one of the two numbers is employed as the common number for the two groups $N_1$, $N_2$.

Next, there will be described the manner in which the control device 10 obtains characteristic information which relates to a characteristic of an object image and which is different from color information relating to the color of the first group. The characteristic information may be the color information representing the color of the second group, position information representing the position of each of the first and second groups, or shape information relating to the shape of the target area.

A straight line connecting the first and second groups intersects, at least one time, a border line between the target area and the non-target area. For the purpose of determining the border line, the present image processing system employs a function, K, defined by the following expression (15):

$$K=f(H,S,H_E,S_E,l_E)-g(H,S,H_R,S_R,l_R) \qquad (15)$$

In the expression (15), the symbols, H and S, indicate HS data, i.e., color information for each picture element; $H_E$ and $S_E$ are HS data, i.e., color information for the first group; $H_R$ and $S_R$ indicate HS data, i.e., color information for the second group; $l_E$ indicates the distance between each picture element and the first group in the real, object image; and $l_R$ indicates the distance between each picture element and the second group in the object image. The functions, f and g, are defined by the following expressions (16) and (17), respectively:

$$f(H,S,H_E,S_E,l_E)=\alpha \cdot D_E\hat{}n_E \cdot l_E\hat{m}_E \qquad (16)$$

$$g(H,S,H_R,S_R,l_R)=\alpha \cdot D_R\hat{}n_r \cdot l_R\hat{m}_R \qquad (17)$$

In the expressions (16), (17), $\alpha$ is a constant, and $D_E$ and $D_R$ are the distance between each picture element and the first group in a color space, and the distance between each picture element and the second group in the color space, respectively, which are defined by the following expressions (18) and (19), respectively:

$$D_E=\{(H_E-H)^2+(S_E-S)^2\}\hat{}(½) \qquad (18)$$

$$D_r=\{(H_R-H)^2+(S_r-S)^2\}\hat{}(½) \qquad (19)$$

In the expressions (16) to (19), the symbol "^" indicates power, for example, "a^b" means --$a^b$--.

If a function value K determined for a picture element is not smaller than a predetermined threshold value, $K_{TH}$, the control device 10 judges that that picture element belongs to the target area. On the other hand, if a function value K determined for a picture element is smaller than the threshold $K_{TH}$, the control device 10 judges that that picture element belongs to the non-target area.

First, there will be described the case where a target area is determined based on only color information. That is, the expressions (16) and (17) are used based on only color information. For example, in the case where $\alpha=1$, $n_E=-1$, $m_E=0$, $n_R=-1$, and $m_R=0$, the expressions (16) and (17) lead to the following expressions (20) and (21), respectively:

$$f=1/D_E \qquad (20)$$

$$g=1/D_R \qquad (21)$$

By substituting f and g occurring in the expression (15) by f and g defined by the expressions (20), (21), the following expression (22) is obtained:

$$K=1/D_E-1/D_R \qquad (22)$$

Figure 9:
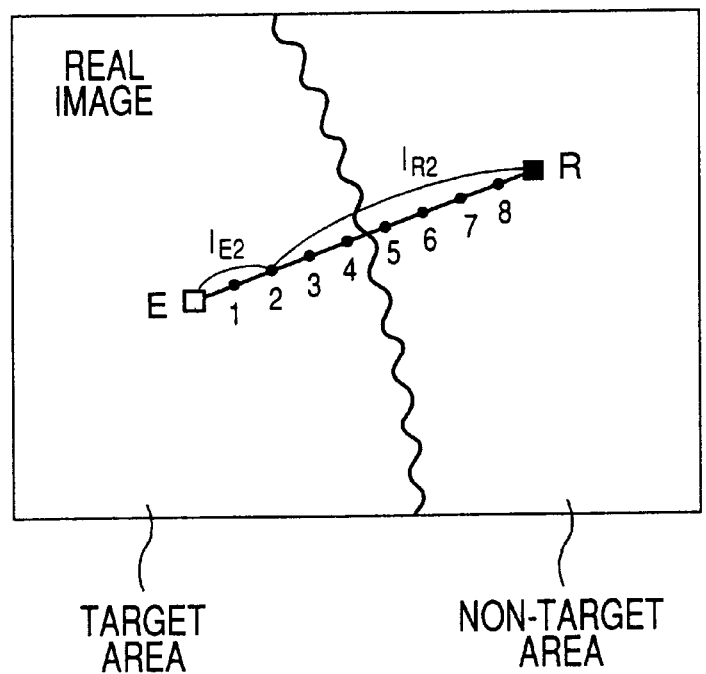
FIG. 9 is a view of an example of a real image as an object image.
Figure 10:
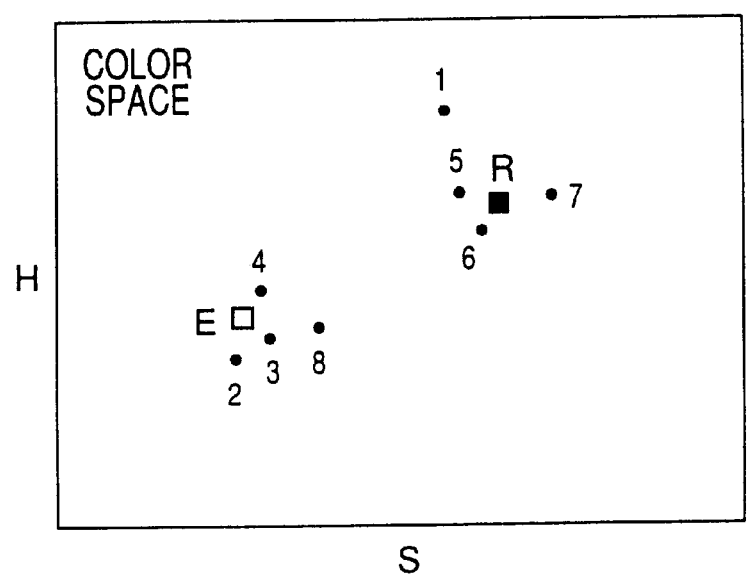
FIG. 10 is a graph showing, in a color space, respective positions of points shown in FIG. 9.

The present system or the control device 10 thereof can determine, using the expression (22), a target area in a real, object image as shown in FIG. 9. In this real image, a target-area picture-element group or first group, E, has been designated in the target area, and a non-target-area picture-element group or second group, R, has been designated in a non-target area. FIG. 9 shows eight points (i.e., picture elements), indicated at numerals "1" to "8", which are located on the segment connecting between the first and second groups E, R and which cooperate with one another to divide the segment into nine equal lengths. FIG. 10 shows the respective positions of those eight points in the color space. The axis of ordinate, H, indicates hue and the axis of abscissa, S, indicates saturation.

Figure 11:
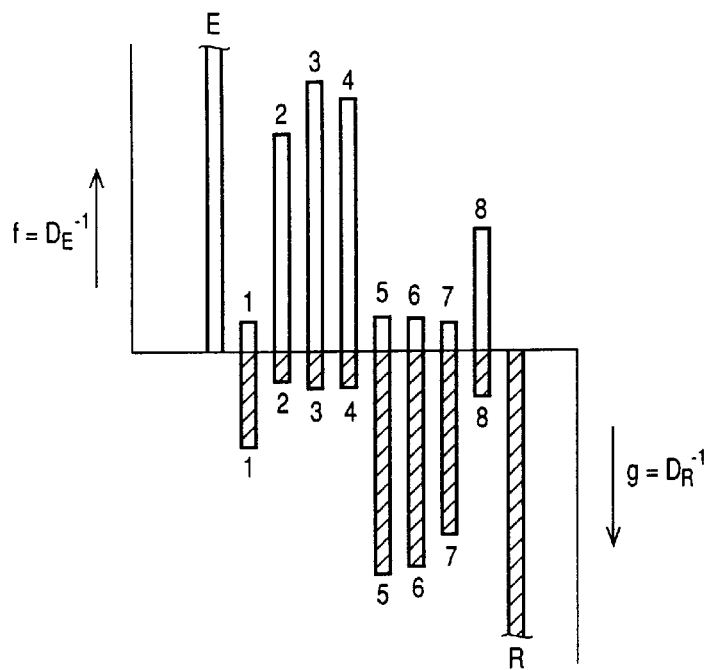
FIG. 11 is a bar graph showing respective values of functions, f and g, determined for each of the points shown in FIG. 9.
Figure 12:
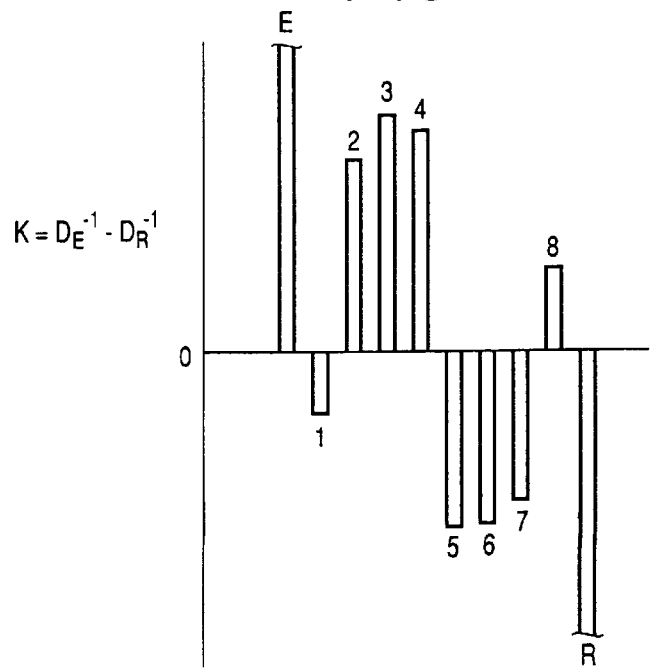
FIG. 12 is a bar graph showing a value of a function, K, determined for each of the points shown in FIG. 9.

FIG. 11 shows a bar graph representing the function values f, g of each of the eight points. The values f, g are defined by the expressions (20), (21), respectively. FIG. 12 shows a bar graph representing the function value K of each of the eight points. The values K are defined by the expression (22).

In the previously-described conventional image processing device or method, a target area is determined based on only the function f defined by the expression (20). That is, in the prior art, a function value f is determined for each picture element, and a target area is determined, i.e., a threshold value, $f_{TH}$, is determined for dividing all the function values f into two groups.

On the other hand, in the present embodiment, a target area is determined by determining a threshold value $K_{TH}$ for dividing all the function values K into two groups. The threshold value $K_{TH}$ is more easily determined than the threshold value $f_{TH}$. The function values f are only positive values whereas the function values K include negative values (at least the function values K for the second group R are negative). Therefore, the threshold value $K_{TH}$ may be determined, without needing any specific reason, to be equal to $0(K_{TH}=0)$, with a considerable reliability. This reliability improves in a particular case where the first and second groups E, R are designated appropriately as described later.

As is apparent from the foregoing description, a target area can be determined, with higher accuracy, based on the color information of the second group R in addition to the color information of the first group E, without needing any position information. Thus, this case falls within the scope of the present invention. In this case, the color information of the second group R is the characteristic information which represents a characteristic of the object image and which is different from the color information of the first group E.

However, if the threshold value K=0 is applied to the example shown in FIG. 12, the control device 10 judges that the first point that in fact belongs to the target area belongs to the non-target area and that the eighth point that in fact belongs to the non-target area belongs to the target area. Thus, the accuracy of the function K defined by the expression (22) is not satisfactorily high.

In order to solve the above problem, it is desirable to take into consideration position information representing the position of each of the first and second groups E, R in the object image, for example, the respective distances between each picture element and the first and second groups E, R.

Next, there will be described the case where a target area is determined based on both color information and position information. That is, the expressions (16) and (17) are used based on both color information and position information. For example, in the case where $\alpha=1$ and $n_E=m_E=n_R=m_R=-1$, the expressions (16) and (17) lead to the following expressions (23) and (24), respectively:

$$f=(1/D_E) \cdot (1/l_E) \quad (23)$$

$$g=(1/D_R) \cdot (1/l_R) \quad (24)$$

By substituting f and g occurring in the expression (15) by f and g defined by the expressions (23), (24), the following expression (25) is obtained:

$$K=(1/D_E) \cdot (1/l_E) - (1/D_R) \cdot (1/l_R) \quad (25)$$

Figure 13:
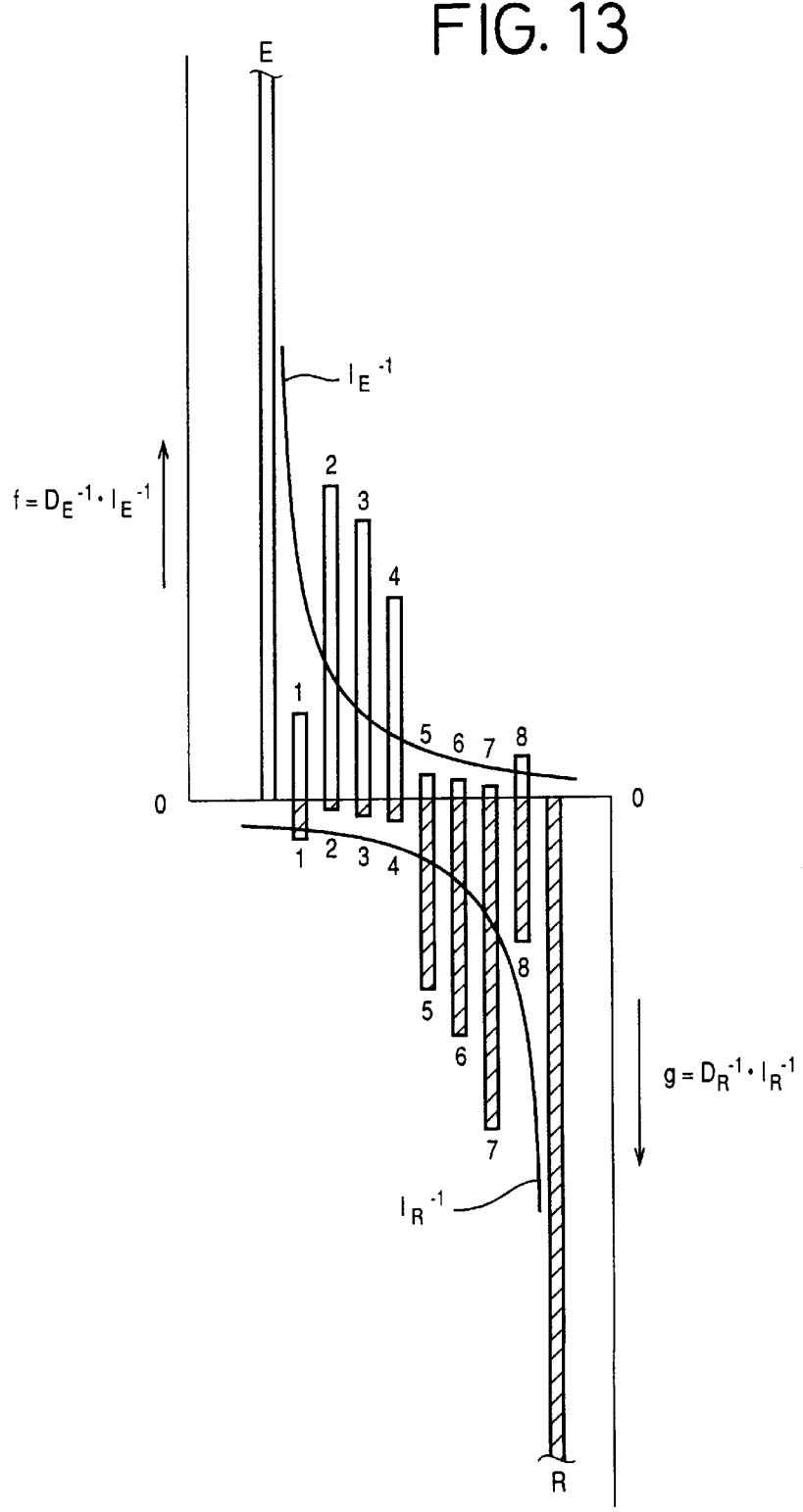
FIG. 13 is a bar graph showing respective values of different functions, f and g, determined for each of the points shown in FIG. 9.

FIG. 13 shows a bar graph representing the function values f, g of each of the eight points shown in FIG. 9. The values f, g are defined by the expressions (23), (24), respectively. FIG. 13 also shows a graph representing the inverse, $1/l_E$, $1/l_R$, of the distance of each point from each of the first and second groups E, R in the real, object image.

Figure 14:
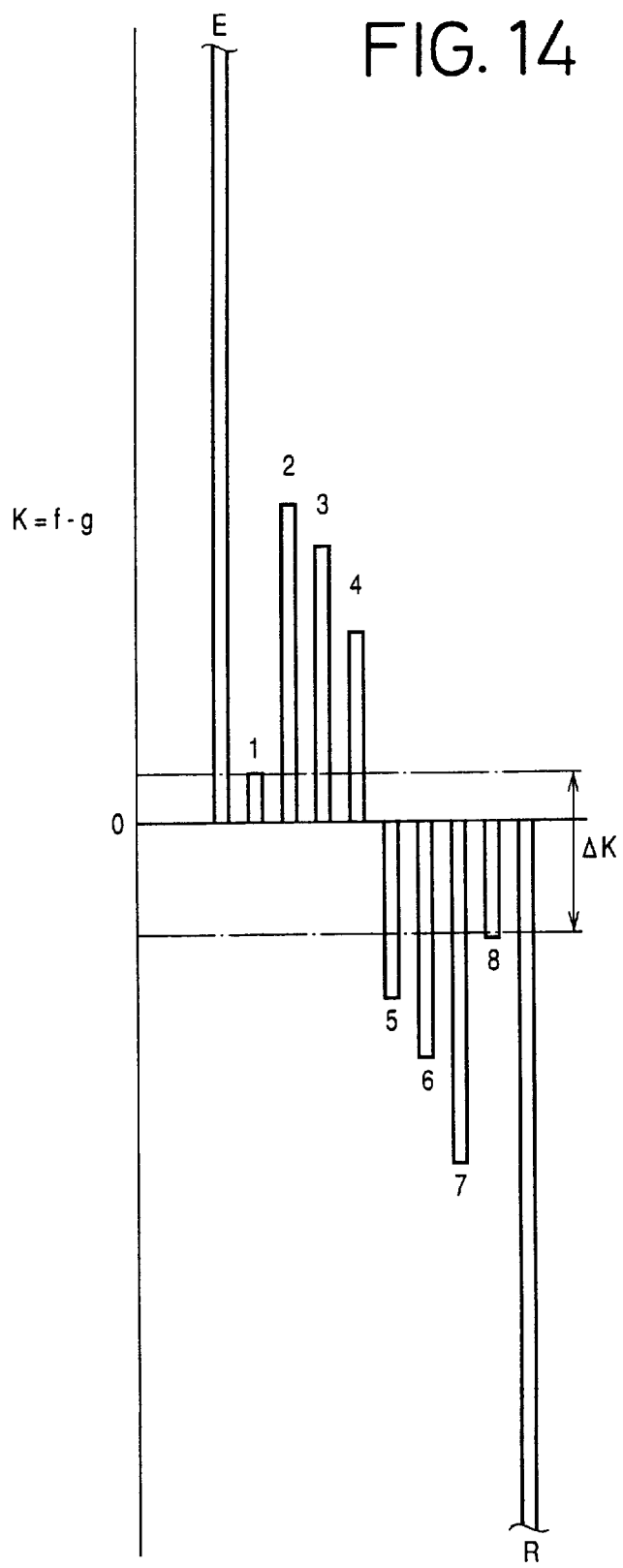
FIG. 14 is a bar graph showing a value of a different function, K, determined for each of the points shown in FIG. 9.

FIG. 14 shows a bar graph representing the function value K of each of the eight points. The values K are defined by the expression (25). In the case where the threshold value $K_{TH}$ is determined to fall in a range, $\Delta K$, the first to fourth points belonging to the target area and the fifth to eighth points belonging to the non-target area are correctly distinguished from one another. The function K defined by the expression (25) has been developed from the experience that picture elements nearer to the first group E belong to the target area with higher possibility and picture elements nearer to the second group R belong to the non-target area with higher possibility. In this case, the color information of the second group R and the position information representing the respective positions of the first and second groups E, R in the object image are utilized as the characteristic information of the object image, in addition to the color information of the first group E.

Next, there will be described a second embodiment of the present invention. The second embodiment relates to an image processing system having the same hardware construction as shown in FIG. 1. However, a control device 10 of the image processing system as the second embodiment employs a function, K, defined by the following expression (26), for utilizing, as characteristic information, shape information relating to a shape of a target area, as well as color information representing the color of a designated non-target-area picture-element group, i.e., second group R:

$$K=\beta \cdot (D_R^{-1} \cdot l_E \hat{} m_E - D_E^{-1} \cdot l_R \hat{} m_R) \quad (26)$$

where $\beta$ is a constant.

Assuming that a set of color information for a picture element in question represents a color just at the middle between the respective colors represented by respective sets of color information for first and second groups E, R, that is, assuming $D_E=D_R=D$, and simultaneously assuming that D is constant, the function K defined by the expression (27) is rewritten as follows:

$$K=\gamma \cdot (l_E \hat{} m_E - l_R \cdot mR) \quad (27)$$

where $\gamma = \beta \cdot D^{-1}$ (i.e., constant value).

In addition, assuming $m_E = m_R = 2$ in the expression (27), the following expression (28) is obtained:

$$K=\gamma \cdot (l_E^2 - l_R^2) \quad (28)$$

If a function value K of a picture element determined according to the expression (28) is not greater than a threshold value $K_{TH}$, the control device 10 judges that that picture element belongs to the target area. Otherwise, the control device 10 judges that that picture element belongs to the non-target area. The following expression (29) is obtained by substituting K occurring in the expression (28) by the threshold value $K_{TH}$ and rearranging the expression (28):

$$l_E^2 - l_R^2 = K_{TH}/\gamma \quad (29)$$

Figure 15:
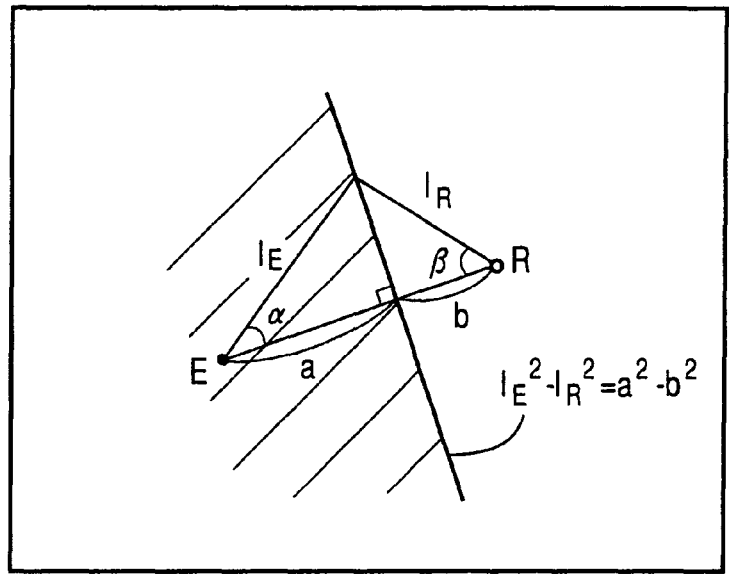
FIG. 15 is a view for illustrating a geometrical relationship among a border line between a target area and a non-target area, a designated target-area picture-element group, a designated non-target-area picture-element group.

FIG. 15 geometrically illustrates the expression (29). A border line separating the target area and the non-target area is a straight line defined by the threshold value $K_{TH}$. In this case, it may be assumed that all the picture elements of an object image have substantially the same color information, i.e., substantially the same color and that the border line between the target and non-target areas exists in the neighborhood of a straight line located between the first and second groups, E, R.

In the case where a target area is determined based on respective sets of color information for the first and second groups E, R in addition to shape information indicating that the border line between the target and non-target areas exists in the neighborhood of a straight line located between the first and second groups E, R, the following expression (30) may be used:

$$K=\beta \cdot (D_R^{-1} \cdot l_E^2 - D_E^{-1} \cdot l_R^2) \quad (30)$$

In the expression (30), the greater the value $D_E^{-1}$ is and the smaller the value $D_R^{-1}$ is, the nearer the picture element in question is to the first group E in the color space, i.e., belongs to the target area with higher possibility. Therefore, if an operator designates a first and a second group E, R at appropriate positions, respectively, in a real, object image while viewing it on the monitor 40, and inputs information indicating $m_E = m_R = 2$ by operating an input device such as a keyboard 36 and/or a mouse 38 (FIG. 1), the control device 10 determines whether each picture element in the object image belongs to a target area or not, by judging whether a function value K of that picture element is smaller than a threshold value $K_{TH}$. Thus, the target area is determined with higher reliability.

In the case where it is assumed that $m_E = m_R 1$ in the expression (27), the following expression (31) is obtained:

$$K = \gamma \cdot (l_E - l_R) \quad (31)$$

Likewise, if a function value K of a picture element determined according to the expression (31) is not greater than a threshold value $K_{TH}$, the control device 10 judges that that picture element belongs to a target area. Otherwise, the control device 10 judges that that picture element belongs to a non-target area. The following expression (32) is obtained by substituting K occurring in the expression (31) by the threshold value $K_{TH}$ and rearranging the expression (31):

$$l_E - l_R = K_{TH}/\gamma \quad (32)$$

Figure 16:
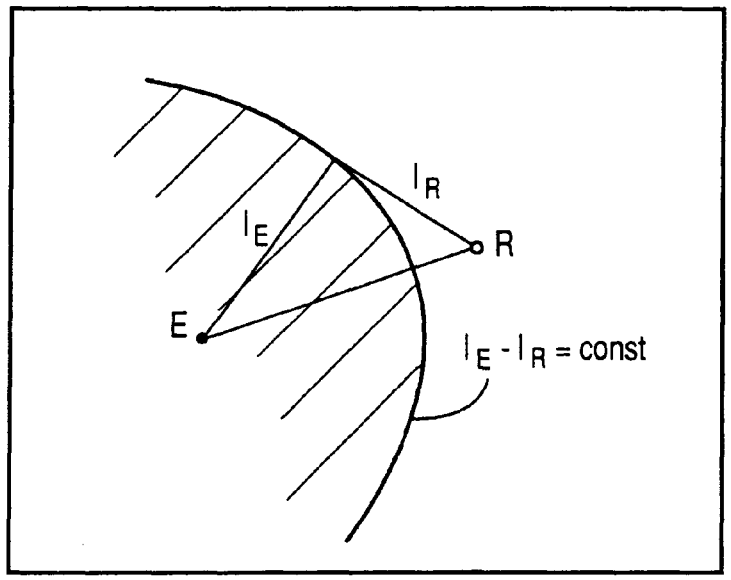
FIG. 16 is a view for illustrating a different geometrical relationship among a border line between a target area and a non-target area, a designated target-area picture-element group, a designated non-target-area picture-element group.

FIG. 16 geometrically illustrates the expression (32). A border line separating the target area and the non-target area is a hyperbola defined by the threshold value $K_{TH}$.

In the case where a target area is determined based on respective sets of color information for a first and a second group E, R in addition to shape information indicating that the border line between the target and non-target areas exists in the neighborhood of a hyperbola located between the first and second groups E, R, the following expression (33) may be used:

$$K = \beta \cdot (D_R^{-1} \cdot l_E - D_E^{-1} \cdot l_R) \quad (33)$$

In the expression (33), likewise, the greater the value $D_E^{-1}$ is and the smaller the value $D_R^{-1}$ is, the nearer the picture element in question is to the first group E in the color space, i.e., belongs to the target area with higher possibility.

In the second embodiment, the control device 10 may use a different function K defined by the following expression (34):

$$K = \delta \cdot (D_R/D_E) \cdot \min(l_E + l_R)/l_E \quad (34)$$

In the expression (34), δ is a constant, and $\min(l_E + l_R)$ indicates the smallest distance between a first and a second group E, R in a real, object image, i.e., the length of a segment connecting between the first and second groups E, R.

If a function value K of a picture element determined according to the expression (34) is not greater than a threshold value $K_{TH}$, the control device 10 judges that that picture element belongs to the target area. Otherwise, the control device 10 judges that that picture element belongs to the non-target area. The following expression (35) reflecting the shape of the target area is obtained by substituting K occurring in the expression (34) by the threshold value $K_{TH}$:

$$l_E = \delta \cdot (D_R/D_E) \cdot \min(l_E + l_R)/K_{TH} \quad (35)$$

Figure 17:
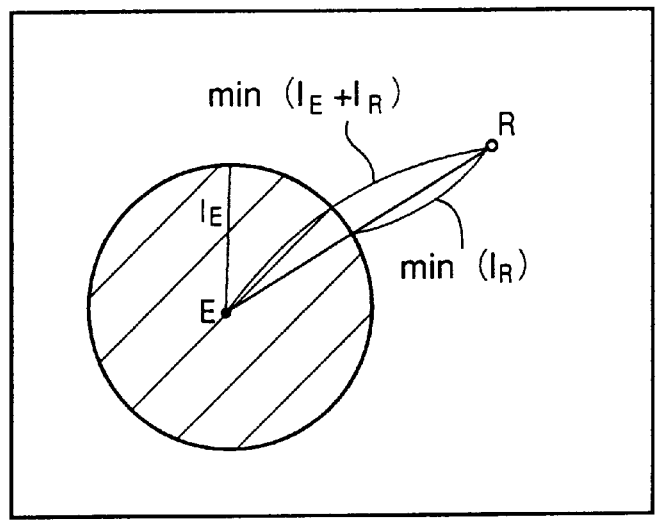
FIG. 17 is a view for illustrating a different geometrical relationship among a border line between a target area and a non-target area, a designated target-area picture-element group, a designated non-target-area picture-element group.

FIG. 17 geometrically illustrates the expression (35), assuming that $D_R/D_E$ is constant and accordingly $l_E$ is constant. A border line separating the target area and the non-target area is a circle defined by the threshold value $K_{TH}$. In this case, it may be assumed that all picture elements of an object image have substantially the same color information, i.e., substantially the same color and that the border line between the target and non-target areas exists in the neighborhood of a circle located between the first and second picture-element groups E, R. In the expression (35), the greater the value $D_R/D_E$ is, the nearer the picture element in question is to the first group E in the color space, i.e., belongs to the target area with higher possibility.

The border line of the target area shown in each of FIGS. 15, 16, and 17 is a provisional border line obtained by substituting, by $D_R/D_E=1$, $D_R$ and $D_E$ occurring in each of the expressions (29), (32), and (35). On the other hand, the target area determined by comparison between the function values K determined according to each of the expressions (30), (33), and (34) and a corresponding threshold value $K_{TH}$, is a true target area which is determined by taking into consideration color information of each picture element. However, in the present embodiment, a function value K need not be determined or calculated with respect to all the picture elements of the object image, but may be limited to the picture elements in the neighborhood of the provisional border line. Therefore, the target area can be determined in a shorter time.

It is natural that the color of a target area or a non-target area in an object image is not uniform, i.e., more or less uneven. Therefore, in the case where a target area is determined based on only color information, the target area may not be determined with accuracy because of the color unevenness of the target or non-target area. More specifically, a portion of a true target area may be judged as belonging to a non-target area, or a portion of a true non-target area may be judged as belonging to a target area. In the present embodiment, no portion of an object image that is distant from a provisional border line of a target area that is specified by an operator is judged as belonging to an incorrect area.

The foregoing description has been made with respect to the case where a target area and a non-target area in an object image have a similar color. In the case, however, where their colors are different from each other, an operator need not designate any second group.

Figure 18:
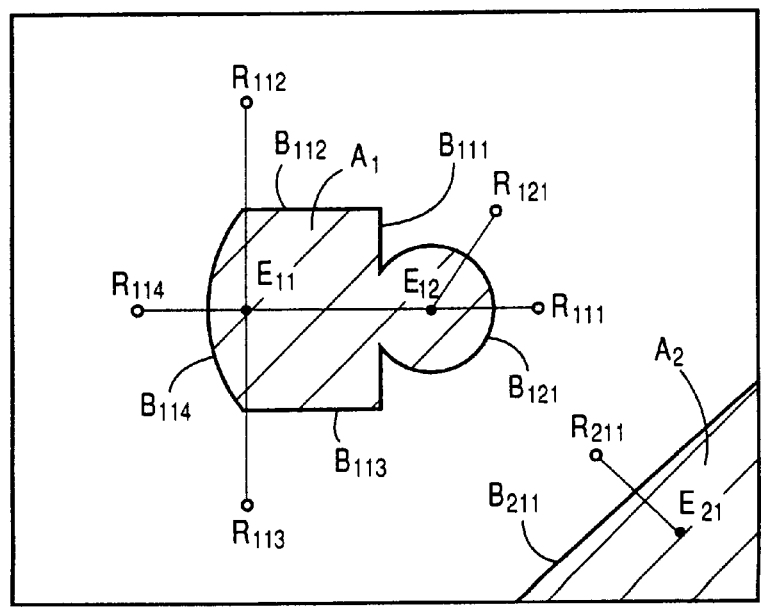
FIG. 18 is a view of an example of an object image including two target areas, $A_1$ and $A_2$.

Next, there will be described the operation of the control device 10 of the image processing system as the second embodiment, for separating one or more target areas from a non-target area in an object image. FIG. 18 shows an object image including two target areas, $A_1$ and $A_2$. The target area $A_1$ includes two designated target-area picture-element groups, i.e., two first groups, $E_{11}$ and $E_{12}$, and the target area $A_2$ includes one first group, $E_{21}$. One or more designated non-target-area picture-element groups, i.e., one or more second groups correspond to each of the first group $E_{11}$, $E_{12}$, $E_{21}$. More specifically, four second groups $R_{111}$, $R_{112}$, $R_{113}$, and $R_{114}$ correspond to the first group $E_{11}$; one second group $R_{121}$ corresponds to the first group $E_{12}$; and one second group $R_{211}$ corresponds to the first group $E_{21}$. FIG. 18 additionally shows a border line corresponding, one to one, to each of the six second groups such that each border line is indicated at "B" having the same number as the number added to "R" of the corresponding second group. As described below, an operator inputs parameters, through the input device 36, 38, various parameters defining a straight line to be used as a border line corresponding to each of the second groups $R_{111}$, $R_{112}$, $R_{113}$, $R_{211}$, a circle as a border line corresponding to the second group $R_{121}$, and a hyperbola as a border line corresponding to the second group $R_{114}$.

Figure 19:
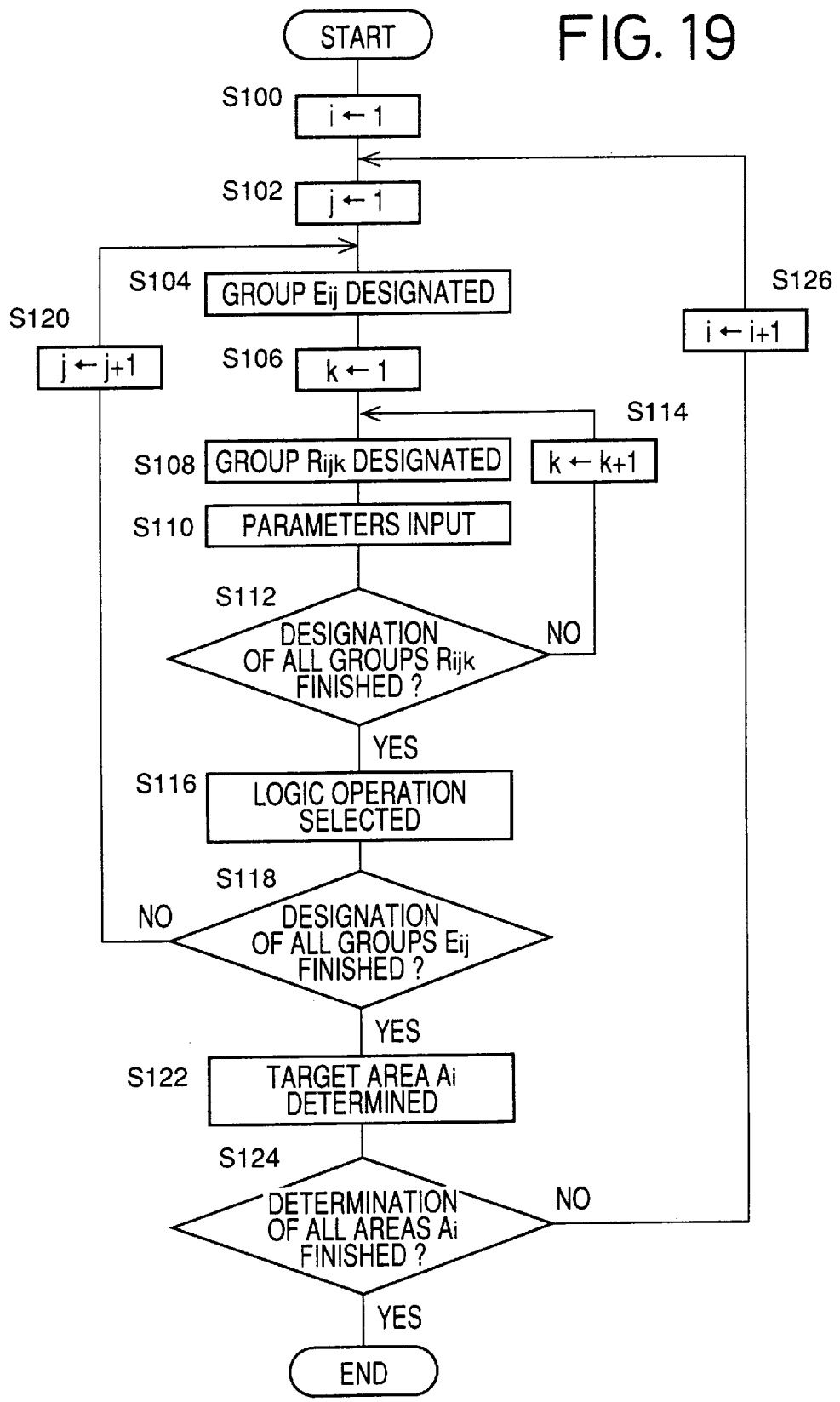
FIG. 19 is a flow chart representing a control program according to which the image processing system of FIG. 1 determines one or more target areas in an object image.

FIG. 19 shows a flow chart representing a control program according to which the control device 10 can operate for designating a plurality of first groups $E_{ij}$ and a plurality of second groups $R_{ijk}$, and determining a plurality of target areas $A_i$. This control program is pre-stored in the ROM 14 of the control device 10. The CPU 12 can read the control program from a floppy disk (not shown) and store the program in the ROM 14.

First, at Step S100, a counter, i, is reset to 1 (i.e., i=1) and, at Step S102, a counter, j, is reset to 1 (i.e., j=1). Step S102 is followed by Step S104 where an operator inputs, according to information displayed on the monitor 40 connected to the monitor interface 28, position data representing the position of a primary target-area picture element, through the input device such as the mouse 38 and/or the keyboard 36. The control device 10 automatically determines and designates a first group $E_{ij}=E_{11}$ based on the input position of the primary target-area picture element such that the first group $E_{ij}$ has a predetermined pattern as shown in FIG. 8.

Steps S106 to S118 are carried out for one first group $E_{ij}=E_{11}$ designated at Step S104. First, at Step S106, a counter, k, is reset to 1 (i.e., k=1). Step S106 is followed by Step S108 where the operator inputs position data representing the position of at least one primary non-target-area picture element, in the same manner as that employed at Step S104. The control device 10 automatically determines and designates a second group $R_{ijk}$ based on the input position of each of the primary non-target-area picture elements such that each second group $R_{ijk}$ has a predetermined pattern as shown in FIG. 8.

Subsequently, the control of the CPU 12 of the control device 10 goes to Step S110 where the operator inputs various parameters while viewing the real, object image and the information displayed on the monitor 40. For example, the operator inputs, through the input device 36, 38, data indicative of one of the expressions (26), (33), (35) which defines a function K suitable for the shape of a border line, a threshold value $K_{TH}$ suitable for that function K, and various constants. The monitor 40 displays the border line defined by the input parameters, so that the operator adjusts or changes the parameters while viewing the image being displayed on the monitor 40. Step S110 is followed by Step S112 to judge whether the designation of one or more second groups $R_{ijk}$ has been finished, based on information input by the operator. If a positive judgment is made at Step S112, the control of the CPU 12 goes to Step S116. On the other hand, If a negative judgment is made at Step S112, the control goes to Step S114 to add one to the counter k and then goes to Step S108 and the following steps. Once the control device 10 designates one first group $E_{ij}=E_{11}$ and one or more second groups $R_{ijk}$, the control device 10 automatically determines one area based on the respective positions of the designated first and second groups $E_{ij}$, $R_{ijk}$, according to "AND" logic operation. In the case where a border line between two groups E, R, defined by a function K, is a straight line, a half plane is determined as the above one area; and in the case where a border line is a circle, the internal area of the circle is determined as the one area. Regarding the example shown in FIG. 18, the area defined by the four border lines $B_{111}$, $B_{112}$, $B_{113}$, and $B_{114}$ is determined as the one area by the AND logic operation.

Step S116 where a provisional target area is determined will be described later in detail.

Thus, before the control of the CPU 12 enters Step S118, one provisional target area is determined at Step S116. At Step S118, the CPU 12 judges whether the provisional target area determined at Step S116 should be adopted as a true target area $A_i$ or not, based on information input by the operator. If not, the operator inputs data representing the position of another primary target-area picture element $E_{ij}=E_{12}$, so that the control of the CPU 12 goes to Step S120 to add one to the counter j and then goes to Step S104 and the following steps. Thus, the CPU 12 determines another area based on the respective positions of the designated first and second groups $E_{12}$, $R_{121}$, as shown in FIG. 18.

At Step S116, the CPU 12 determines a provisional target area based on a plurality of areas each of which has been determined based on the respective positions of the designated first and second groups $E_{ij}$, $R_{ijk}$ and the parameters input by the operator. In the case where the operator inputs the respective positions of two first groups $E_{i1}$, $E_{i2}$ for one target area $A_i$, as shown in FIG. 18, generally, two areas determined based on the respective positions of the first groups $E_{i1}$, $E_{i2}$ and corresponding second groups $R_{i1k}$, $R_{i2k}$ do not coincide with each other. Hence, a provisional target area is determined according to a known binary-image combining technique such as AND, OR, NOT, EOR (exclusive OR), or CLR (clear) logic operation. Regarding the example shown in FIG. 18, the OR logic operation is used to determine the area $A_1$ defined by the four border lines $B_{111}$, $B_{112}$, $B_{113}$, and $B_{114}$, and the area $A_2$ defined by the circular border line $B_{121}$.

If a positive judgment is made at Step S118, the control of the CPU 12 goes to Step S122 to determine the last provisional target area as a true target area $A_i=A_1$. Step S122 is followed by Step S124 to judge whether the determination of all target areas $A_i$ has been finished or not, based on information input by the operator. If not, i.e., if another target area should be determined in the object image, the control of the CPU 12 goes to Step S126 to add one to the counter i and then goes to Step S102 and the following steps.

In the second embodiment, shape information relating to the shape of a target or non-target area is obtained by selecting one of the different functions K. However, assuming that a border line is a middle line between a plurality of first groups E and a plurality of second groups R, the control device 10 may obtain shape information as the data representing the respective positions of the first and second groups input by the operator. In the latter case, the image processing system can obtain shape information representing any shape. In addition, the mouse 38 may be used to input data representing a continuous first or second groups E, R along a border line.

Figure 20:
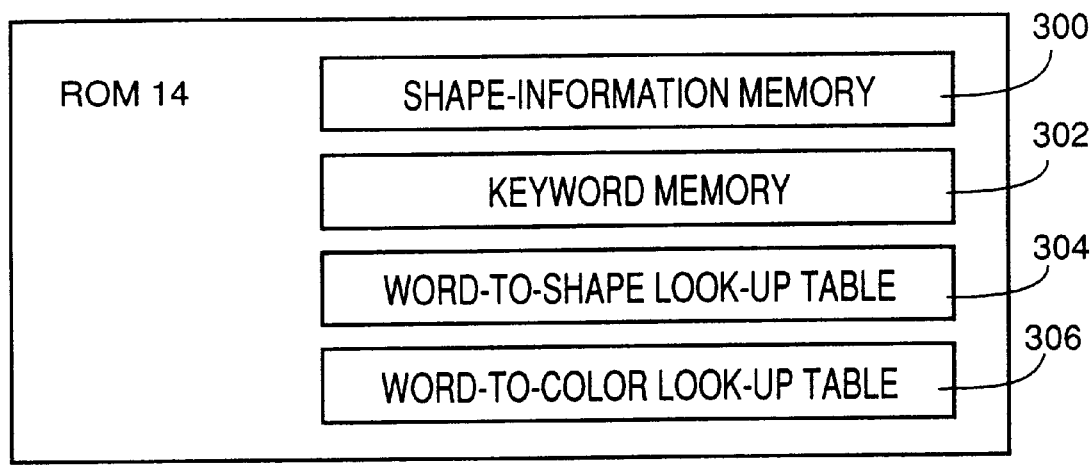
FIG. 20 is a diagrammatic view of a ROM of a control device of an image processing system as another embodiment of the present invention.

Next, there will be described a third embodiment of the present invention. The third embodiment also relates to an image processing system having the same hardware construction as that of the first embodiment shown in FIG. 1. However, as shown in FIG. 20, a ROM 14 of a control device 10 includes a shape-information memory 300 which stores a plurality of sets of shape information representing a plurality of shapes such as a straight line, a circle, a hyperbola, etc; a keyword memory 302 which stores a plurality of keywords (e.g., vehicle, banana, profile, word, sentence, etc.) as identifiers for identifying the above different shapes from one another; and a word-to-shape look-up table 304 which is used by a CPU 12 for associating a keyword input by an operator through an input device 36, 38, with a corresponding shape stored in the shape-information memory 300. The ROM 14 further includes a word-to-color look-up table 306 is used by the CPU 12 for relating a keyword input by the operator through the input device 36, 38, to a corresponding set of color information stored therein, or vice versa as described later. The word-to-color look-up table 306 stores sets of color information in accordance with the previously-indicated CIE XYZ color system. As shown in FIG. 21, the word-to-shape look-up table 304 stores a table containing a plurality of addresses designating a plurality of places where the sets of shape information are stored in the shape-information memory 300. The sets of shape information correspond to the previously-described various functions K defined by, e.g., the expressions (29), (32), and (35). As shown in FIG. 22, the word-to-color look-up table 306 stores a table containing a plurality of keywords and corresponding sets of color information.

Next, there will be described the operation of the image processing system as the third embodiment, by reference to the flow chart of FIG. 23 representing a control program according to which the control device 10 or the CPU 12 operates for obtaining shape information and color information. The control program corresponds to Step S110 of FIG. 19. The same steps as the other steps S100 to S108 and S112 to S126 of FIG. 19 are also carried out in the third embodiment. This program is provided for reducing the burden to the operator in inputting the previously-described parameters.

First, at Step S300, the CPU 12 searches one or more suitable keywords based on color information representing the color of a first group $E_{ij}$ and the word-to-color look-up table 306. More specifically, the CPU 12 seeks for such a keyword that the difference (i.e., distance in the color space) between the color corresponding to the keyword and the color represented by the color information of the first group $E_{ij}$ is smaller than a reference value. At this steps, two or more keywords may be found. The color represented by the color information of the first group $E_{ij}$ may be a simple or weighed average of the respective colors of picture elements of the first group $E_{ij}$.

Step S300 is followed by Step S302 to command a monitor 40 (e.g., CRT display) to display the keywords found at Step S300, and then goes to Step S304 to select the most appropriate one of the keywords displayed on the monitor 40, based on information input by the operator through the input device 36, 38. That is, the operator selects the most appropriate keyword and keys in the same through the keyboard 36. Subsequently, the control of the CPU 12 goes to Step S306 to select, from the shape-information memory 300, the set of shape information corresponding to the selected keyword, according to the word-to-shape look-up table 304. Step S306 is followed by Step S308 to determine the previously-described parameters based on the selected shape information and the sets of color and position information for the first and second groups $E_{ij}$, $R_{ijk}$.

In the third embodiment, since the parameters are determined by selecting a keyword, the burden to the operator is reduced. In addition, since the control device 10 automatically searches one or more suitable keywords based on the color information of the first group $E_{ij}$, the operator can easily select the most suitable keyword from a reduced number of suitable ones, although the ROM 14 stores a number of sets of keywords corresponding to a number of sets of shape information. At Step S300, the CPU 12 may automatically change the reference value so that at least one keyword may be searched or found. In addition, the monitor 40 may display the reference value in addition to one or more searched keywords, so that the operator may recognize the condition under which the keywords are searched.

In the word-to-shape look-up table 304 and the shape-information memory 300 shown in FIG. 21, one keyword stored in the table 304 may correspond to a plurality of sets of shape information stored in the memory 300. Otherwise, a plurality of keywords stored in the table 304 may correspond to one set of shape information stored in the memory 300. In the last case, a plurality of similar shapes share a common set of shape information, and the memory 300 may have a reduced memory capacity. In the word-to-color look-up table 306 shown in FIG. 21, one keyword stored in the table 306 may correspond to a plurality of sets of color information stored therein, or a set of color-range information representing a range of colors.

In the third embodiment, the operator can operate the image processing system with reduced burden and improved degree of freedom about inputting shape information in the processing system.

Next, there will be described a fourth embodiment of the present invention. The fourth embodiment also relates to an image processing system having the same hardware construction as that of the first embodiment shown in FIG. 1. In the fourth embodiment, a control device 10 determines a target area in an object area based on color information representing respective colors of a first and a second group. Thus, only the color information of the second group is utilized as the characteristic information of the object image.

In the case where the colors of picture elements of a target area are similar to the colors of picture elements of a non-target area, a first pattern, in a color space, of respective sets of color information of the picture elements of the target area is similar to a second pattern, in the color space, of respective sets of color information of the picture elements of the non-target area. However, strictly, the first and second patterns differ from each other. In the present embodiment, the control device 10 determines the target area by utilizing this difference. This is in contrast to a conventional image processing device which utilizes only a pattern corresponding to the above-indicated first pattern. Accordingly, the prior device requires that a threshold value be pre-determined and pre-stored for judging whether a pattern, in the color space, of respective sets of color information for picture elements neighboring each picture element in an object image coincides with the first pattern or not. On the other hand, in the fourth embodiment, the second pattern is used in place of the threshold value. Thus, in the present embodiment, it is not required to predetermine a threshold value appropriate for each of a variety of object images.

There will be described the operation of the present image processing system for determining a target area in an object image by utilizing a minimum-distance method known as one of pattern recognition techniques.

In the minimum-distance method, a pattern in a space is represented by a vector, and the distance between two vectors is used for pattern recognition or separation. In the present embodiment, the dimension of the first and second vectors corresponding to the first and second patterns is 2N where each of the first and second groups consists of N picture elements (FIG. 8). A set of color information for each picture element consists of previously described HS data. When a first and a second group are designated, the control device 10 determines a first and a second vector corresponding to the first and second groups, i.e., calculates the 2N components of each of the first and second vectors. Then, the control device 10 determines a third vector corresponding to the pattern in the color space of respective sets of color information of picture elements neighboring each picture element of the object image, in the same manner as that used to determine the first and second vectors, and calculates the respective distances between the third vector and each of the first and second vectors. If the third vector is nearer to the first vector than to the second vector, the control device 10 judges that the picture element in question belongs to the target area. In the case where it is assumed that the first, second, and third vectors are represented by $V_1$, $V_2$, and $V_P$, respectively, if $\|V_1-V_P\|<\|V_2-V_P\|$, the picture element in question is judged to be within the target area and, if $\|V_1-V_P\|>\|V_2-V_P\|$, the picture element in question is judged to be within the non-target area. The symbol "∥(expression) ∥" indicates the norm of the vector defined by the expression.

While the present invention has been described in its preferred embodiments, the present invention may otherwise be embodied.

For example, while in the illustrated embodiments color information representing the color of each of picture elements of an object image comprises values corresponding to hue and saturation, respectively, color information additionally comprising a value corresponding to luminance may be used for distinguishing a target area from a non-target area in an object image.

In addition, in the fourth embodiment, a target area may be identified from a non-target area in a vector-using pattern recognizing method different from the illustrated one.

It is to be understood that the present invention may be embodied with other changes, improvements, and modifications that may occur to those skilled in the art without departing from the spirit and scope of the invention defined in the appended claims.

What is claimed is:

1. An image processing apparatus comprising:
   a color information obtaining device which obtains color information relating to a color of a target area pixel group consisting of a plurality of pixels belonging to a target area as one of a plurality of areas present in an object image,
   said color information obtaining device comprising a target area pixel designator which is operable by an operator for designating at least one primary target area pixel belonging to the target area,
   the color information relating to a color of each of the at least one primary target area pixel designated by the target area pixel designator and a plurality of secondary target area pixels automatically determined based on the primary target area pixel, the primary and secondary target area pixels providing, as the target area pixel group, a designated target area pixel group;
   a characteristic information obtaining device which obtains characteristic information which relates to a characteristic of the object image and which is different from the color information,
   the characteristic information obtaining device comprising an input device which is operable by the operator for inputting input information, and characteristic-information obtaining means for obtaining the characteristic information based on the input information,
   the input device comprising the target area pixel designator, and a non-target area pixel designator which is operable by the operator for designating at least one primary non-target area pixel belonging to a non-target area of the object image as a different one of the areas from the target area,
   the characteristic information comprising color information relating to a color of each of the at least one primary non-target area pixel designated by the non-target area pixel designator and a plurality of secondary non-target area pixels automatically determined based on the at least one primary non-target area pixel, the primary and secondary non-target area pixels providing a designated non-target area pixel group, the characteristic information further comprising first position information relating to a position of the designated target area pixel group in the object image, and second position information relating to a position of the designated non-target area pixel group in the object image; and
   target area determining means for determining the target area in the object image by determining a value of a function K that has independent variables including a color space distance between each of a plurality of pixels belonging to the object image and the target area pixel group, a color space distance between said each pixel and the non-target area pixel group, a spatial distance between said each pixel and the target area pixel group, and a spatial distance between said each pixel and the non-target area pixel group and comparing said value of the function K to a threshold for the function K for determining which of said plurality of pixels of the object image belong to the target area and which of said plurality of pixels of the object image belong to the non-target area.

2. An apparatus according to claim 1, wherein said target-area pixel designator comprises means for designating said secondary target-area pixels based on color information relating to the color of said at least one primary target-area pixel and color information relating to a color of each of a plurality of pixels neighboring the primary target-area pixel.

3. An apparatus according to claim 1, wherein said color information relating to the color of said each of said at least one primary and secondary target-area pixels of said designated target-area pixel group comprises first color information relating to a hue of said each target-area pixel and second color information relating to a saturation of said each target-area pixel.

4. An apparatus according to claim 1, wherein said non-target-area pixel designator comprises means for designating said secondary non-target-area pixels based on color information relating to the color of said primary non-target-area pixel and color information relating to a color of each of a plurality of pixels neighboring the primary non-target-area pixel.

5. An apparatus according to claim 1, wherein the function K is expressed as follows:

$$K=f(H,S,H_E,S_E,1_E)-g(H,S,H_R,S_R,1_R)$$

where H and S respectively indicate a hue and a saturation of said each of the plurality of pixels belonging to the object image, $H_E$ and $S_E$ respectively indicate a hue and a saturation of the target area group, $H_R$ and $S_R$ indicate a hue and a saturation of the non-target area group, $1_E$ indicates the spatial distance between said each pixel of the object image and the target area pixel group, and $1_R$ indicates the spatial distance between said each pixel of the object image and the non-target area pixel group.

6. An apparatus according to claim 1, wherein the input device is operable by the operator for inputting said input information comprising shape information relating to a shape of said target area, and said characteristic-information obtaining means comprises means for obtaining said characteristic information relating to said shape of said target area, based on said input information comprising said shape information.

7. A recording medium in which an image-processing control program is recorded which is readable by a computer and usable to control the computer to process image data, the program comprising the steps of:

obtaining color information relating to a color of a target area pixel group consisting of a plurality of pixels belonging to a target area as one of a plurality of areas present in an object image, by operating a target area pixel designator for designating at least one primary target area pixel belonging to the target area, the color information relating to a color of each of the at least one primary target area pixel designated by the target area pixel designator and a plurality of secondary target area pixels automatically determined based on the primary target area pixel, the primary and secondary target area pixels providing, as the target area pixel group, a designated target area pixel group, obtaining characteristic information which relates to a characteristic of the object image and which is different from the color information, by upon operation of an input device for inputting input information, and obtaining the characteristic information based on the input information, wherein the step of operating the input device comprises operating the target area pixel designator, and operating a non-target area pixel designator for designating at least one primary non-target area pixel belonging to a non-target area of the object image as a different one of the areas from the target area, the characteristic information comprising color information relating to a color of each of the at least one primary non-target area pixel designated by the non-target area pixel designator and a plurality of secondary non-target area pixels automatically determined based on the primary non-target area pixel, the primary and secondary non-target area pixels providing a designated non-target area pixel group, the characteristic information further comprising first position information relating to a position of the designated target area pixel group in the object image, and second position information relating to a position of the designated non-target area pixel group in the object image, and determining the target area in the object image by determining a value of a function K that has independent variables including a color space distance between each of a plurality of pixels belonging to the object image and the target area pixel group, a color space distance between said each pixel and the non-target area pixel group, a spatial distance between said each pixel and the target area pixel group, and a spatial distance between said each pixel and the non-target area pixel group and comparing said value of the function K to a threshold for the function K for determining which of said plurality of pixels of the object image belong to the target area and which of said plurality of pixels of the object image belong to the non-target area.

8. A recording medium according to claim 7, wherein the step of obtaining said color information comprises designating said secondary target-area pixels based on color information relating to the color of said at least one primary target-area pixel and color information relating to a color of each of a plurality of pixels neighboring the at least one primary target-area pixel.

9. A recording medium according to claim 7, wherein the step of obtaining said color information comprises obtaining said color information comprising first color information relating to a hue of said each of said primary and secondary target-area pixels of said designated target-area pixel group, and second color information relating to a saturation of said each target-area pixel.

10. A recording medium according to claim 7, wherein the step of obtaining the characteristic information comprises obtaining, based on the input information comprising shape information relating to a shape of said target area, the characteristic information relating to said shape of said target area.

11. A recording medium according to claim 7, wherein the step of obtaining the characteristic information comprises designating said secondary non-target-area pixels based on color information relating to the color of said at least one primary non-target-area pixel and color information relating to a color of each of a plurality of pixels neighboring the at least one primary non-target-area pixel.

* * * * *